(12) United States Patent
Lockett et al.

(10) Patent No.: US 10,573,468 B2
(45) Date of Patent: *Feb. 25, 2020

(54) PRINTABLE IONIC GEL SEPARATION LAYER FOR ENERGY STORAGE DEVICES

(71) Applicant: Printed Energy Pty Ltd, Brisbane (AU)

(72) Inventors: Vera Nicholaevna Lockett, Phoenix, AZ (US); Mark David Lowenthal, Gilbert, AZ (US); Neil O. Shotton, Tempe, AZ (US); William Johnstone Ray, Fountain Hills, AZ (US); Theodore I. Kamins, Palo Alto, CA (US)

(73) Assignee: Printed Energy Pty Ltd, Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,549

(22) Filed: Oct. 2, 2018

(65) Prior Publication Data

US 2019/0035561 A1 Jan. 31, 2019

Related U.S. Application Data

(63) Continuation of application No. 14/829,243, filed on Aug. 18, 2015, now Pat. No. 10,121,608, which is a
(Continued)

(51) Int. Cl.
*H01M 2/16* (2006.01)
*H01M 10/0568* (2010.01)
(Continued)

(52) U.S. Cl.
CPC ............ *H01G 11/52* (2013.01); *H01G 11/60* (2013.01); *H01G 11/62* (2013.01); *H01G 11/84* (2013.01);
(Continued)

(58) Field of Classification Search
CPC .. H01M 2/164; H01M 2/1646; H01M 10/056; H01M 10/0568
See application file for complete search history.

(56) References Cited

U.S. PATENT DOCUMENTS 6,828,062 B2 * 12/2004 Lu ..................... H01G 9/035
429/213
2008/0138700 A1 * 6/2008 Horpel .................. H01M 2/14
429/129

(Continued)

*Primary Examiner* — Jonathan G Jelsma
(74) *Attorney, Agent, or Firm* — Nancy R. Gamburd; Gamburd Law Group LLC

(57) ABSTRACT

Representative embodiments provide a liquid or gel separator utilized to separate and space apart first and second conductors or electrodes of an energy storage device, such as a battery or a supercapacitor. A representative liquid or gel separator comprises a plurality of particles, typically having a size (in any dimension) between about 0.5 to about 50 microns; a first, ionic liquid electrolyte; and a polymer. In another representative embodiment, the plurality of particles comprise diatoms, diatomaceous frustules, and/or diatomaceous fragments or remains. Another representative embodiment further comprises a second electrolyte different from the first electrolyte; the plurality of particles are comprised of silicate glass; the first and second electrolytes comprise zinc tetrafluoroborate salt in 1-ethyl-3-methylimidalzolium tetrafluoroborate ionic liquid; and the polymer comprises polyvinyl alcohol ("PVA") or polyvinylidene fluoride ("PVFD"). Additional components, such as additional electrolytes and solvents, may also be included.

20 Claims, 3 Drawing Sheets

Related U.S. Application Data continuation of application No. 13/571,272, filed on Aug. 9, 2012, now abandoned.

(60) Provisional application No. 61/672,062, filed on Jul. 16, 2012.

(51) Int. Cl.
| | | |
|---|---|---|
| *H01M 10/056* | (2010.01) | |
| *H01G 11/52* | (2013.01) | |
| *H01M 10/0565* | (2010.01) | |
| *H01M 2/14* | (2006.01) | |
| *H01M 10/0569* | (2010.01) | |
| *H01M 10/0525* | (2010.01) | |
| *H01G 11/60* | (2013.01) | |
| *H01G 11/84* | (2013.01) | |
| *H01G 11/62* | (2013.01) | |

(52) U.S. Cl.
CPC ............ *H01M 2/145* (2013.01); *H01M 2/16* (2013.01); *H01M 2/164* (2013.01); *H01M 2/166* (2013.01); *H01M 2/1646* (2013.01); *H01M 2/1653* (2013.01); *H01M 2/1686* (2013.01); *H01M 10/056* (2013.01); *H01M 10/0525* (2013.01); *H01M 10/0565* (2013.01); *H01M 10/0568* (2013.01); *H01M 10/0569* (2013.01); *H01M 2300/0025* (2013.01); *H01M 2300/0028* (2013.01); *H01M 2300/0085* (2013.01); *Y02E 60/13* (2013.01)

(56) References Cited

U.S. PATENT DOCUMENTS

| | | | |
|---|---|---|---|
| 2011/0281184 A1* | 11/2011 | Friesen | H01M 12/06 429/405 |
| 2012/0241073 A1* | 9/2012 | Wiest | B29C 44/3461 156/62.2 |
| 2013/0052509 A1* | 2/2013 | Halalay | H01M 2/145 429/129 |

* cited by examiner

PRINTABLE IONIC GEL SEPARATION LAYER FOR ENERGY STORAGE DEVICES

CROSS-REFERENCE TO RELATED APPLICATIONS

This application is a continuation of and claims priority to and the benefit of U.S. patent application Ser. No. 14/829,243, filed Aug. 18, 2015, inventors Vera Nicholaevna Lockett et al., titled "Printable Ionic Gel Separation Layer For Energy Storage Devices", which is a continuation of and claims priority to and the benefit of U.S. patent application Ser. No. 13/571,272, filed Aug. 9, 2012, inventors Vera Nicholaevna Lockett et al., titled "Printable Ionic Gel Separation Layer For Energy Storage Devices", which is a nonprovisional of and claims priority to and the benefit of U.S. Provisional Patent Application No. 61/672,062, filed Jul. 16, 2012, inventor Vera Nicholaevna Lockett, titled "Printable Ionic Gel Separation Layer For Energy Storage Devices", which is commonly assigned herewith, the entire contents of which are incorporated herein by reference with the same full force and effect as if set forth in their entirety herein, and with priority claimed for all commonly disclosed subject matter.

FIELD OF THE INVENTION

The present invention in general is related to energy storage technology and, in particular, is related to separators between electrodes for energy storage devices such as supercapacitors and batteries, and more particularly, is related to printable gel separation layers having embedded structural components.

BACKGROUND OF THE INVENTION

Various discrete electrode separators or separation layers for energy storage devices are known. For example, typical separators often consist of a separate porous membrane or sheet which is subsequently (post-fabrication) soaked in an electrolyte and then individually placed and laminated in between two electrodes and the other compositions utilized in the particular device, such as a lithium ion battery. Such a placement and lamination process, however, limits manufacturing throughput and is comparatively expensive. In addition, such lamination processes are not amenable to creating an energy storage device having a substantially flat form factor, and instead typically create a bubble, blister or pillow-shaped device, especially when volatile electrolytes are used and, as a result, are unable to create a series of energy storage cells stably stacked one on top of the other.

Various gelatinous ("gel") separators are also known but are not amenable for use in a printing process. For example, the known gel separators have insufficient structural strength and cannot withstand the physical forces applied during a printing process such as screen printing, resulting in insufficient electrode separation and electrical shorting of the electrodes.

Other known separation techniques have included the provision of embedded separators within the electrodes themselves. Such electrodes, however, must be formed as separate sheets and a lamination or other assembly process also must be utilized for device fabrication, again being comparatively expensive and limiting throughput, as the forces generated in any type of printing process would also result in insufficient electrode separation and electrical shorting of the electrodes.

As a result, a need remains for a liquid or gel separator utilized to separate and space apart first and second electrodes of an energy storage device, such as a battery or a supercapacitor, and which is formed from a composition that is capable of being printed on a wide variety of surfaces, including irregular, uneven or otherwise non-smooth surfaces, for example and without limitation. A resulting separator also may be flexible and capable of being printed or otherwise applied in a wide variety of configurations, shapes, and form factors. Such a separator should also be comparatively thin to minimize or diminish resistivity or other impedance and have a comparatively high ionic conductivity. In addition, a resulting separator should have sufficient structural strength and integrity to allow and facilitate the printing of additional layers, such as additional electrodes and intervening energy storage materials and compositions.

SUMMARY

The exemplary or representative embodiments have a structure different from the structures of previously known electrode or conductor separators. Representative embodiments provide a liquid or gel separator utilized to separate and space apart first and second conductors or electrodes of an energy storage device, such as a battery or a supercapacitor, and compositions therefor.

A representative embodiment of a printable composition to form a liquid or gel separator used for separating and spacing apart at least two conductors or electrodes, such as an anode and cathode, with the liquid or gel separator printable composition (also referred to as an "ink") comprising: a plurality of particles; an ionic liquid electrolyte; and a polymer or polymeric precursor. Such a composition may further comprise additional electrolytes, and further comprise any of various solvents or viscosity modifiers, which may or may not remain in the resulting liquid or gel separator.

Another representative embodiment provides a liquid or gel separator used for separating and spacing apart at least two conductors, electrodes or current collectors (and any intervening layers), with the liquid or gel separator comprising: a plurality of particles; an ionic liquid electrolyte; and a polymer. Such a liquid or gel separator may further comprise additional electrolytes and possibly trace amounts any of various solvents or viscosity modifiers utilized in the printable (ink) composition. Alternatively, depending upon the selected embodiment, such a liquid or gel separator may further comprise such solvents, viscosity modifiers or other compounds and compositions selected to remain in the resulting liquid or gel separator at levels higher than trace amounts.

In a representative embodiment, the plurality of particles are microparticles and have a size (in any dimension) between about 0.5 to about 50 microns, or more particularly between about 0.5 to about 30 microns, or more particularly between about 2.0 to about 20 microns, or more particularly between about 4.0 to about 15 microns, or more particularly between about 5.0 to about 15 microns, or more particularly between about 5.0 to about 10 microns, or more particularly between about 6.0 to about 8.0 microns.

Also in a representative embodiment, for any selected particle size, there may be a comparatively narrow distribution or variance of diameter sizes, such as for a substantially spherical particle, to facilitate comparatively dense packing of the particles in a liquid or gel separator. For example, for a 10 micron selected particle size, it may be advantageous for the particles to be within a 2 micron variance, e.g., 10µ±2µ, and multiple comparatively narrow ranges are also within the scope of the disclosure, such as 7µ±2µ, 10µ±1.5µ, 15µ±3µ, 12µ 1.5µ, and so on.

In another representative embodiment, the particles are packed in one or more layers, generally to be touching or abutting any adjacent particles and, when not abutting, to be within a distance of about a one particle diameter from its neighbors. In an exemplary embodiment, the plurality of particles are substantially spherical and densely packed in a monolayer, or a bilayer, or something in between (e.g., two or fewer layers), to provide a liquid or gel separator having a thickness of 1-2 particle diameters, e.g., a thickness of 1.5 particle diameters. In other exemplary embodiments, additional particle layers may also be utilized.

In another representative embodiment, the plurality of particles are selected from the group consisting of: diatoms, diatomaceous frustules, diatomaceous fragments, diatomaceous remains, and mixtures thereof. For such an exemplary embodiment, the plurality of particles have a size (in any dimension) between about 0.5 to about 200 microns, or more particularly between about 2.0 to about 100 microns, or more particularly between about 2.0 to about 50 microns, or more particularly between about 4.0 to about 30 microns, or more particularly between about 5.0 to about 30 microns. For example and without limitation, a representative diatom, diatomaceous frustule, diatomaceous fragment or other diatomaceous remains may have a size on the order of about 5 microns in diameter and about 20-30 microns in length.

The ionic liquid electrolyte, in a representative embodiment, comprises a combination of one or more types of ionic liquid cations and/or one or more types of ionic liquid anions, and there may be a wide variety of any such combinations of ionic liquid anions and/or cations. In addition, any selected ionic liquid cation or ionic liquid anion may be paired with any other type of ion (anion or cation respectively) which is not an ionic liquid electrolyte, including any another type of anion or cation, such as a salt dissolved in water or another solvent or a salt of an ionic liquid, e.g., lithium bis(trifluoromethylsulfonyl)imide, also for example and without limitation. For example and without limitation, a selected ionic liquid electrolyte combination may include an ionic liquid cation, an ionic liquid anion, a selected salt and a solvent. Also for example and without limitation, a selected ionic liquid electrolyte combination may include an ionic liquid cation or anion and an anion or cation which is not an ionic liquid, such as lithium bis (trifluoromethylsulfonyl)imide mentioned above.

In a representative embodiment, for example and without limitation, a representative ionic liquid cation may be selected from the group consisting of: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and mixtures thereof.

Also for example and without limitation, a representative ionic liquid anion or other type of anion may be selected from the group consisting of: tris(pentafluoroethyl)trifluorophosphate, trifluoromethanesulfonate, hexafluorophosphate, tetrafluoroborate, ethyl sulfate, methyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, thiocyanate, and mixtures thereof.

Continuing with the examples, a representative combination of ionic liquid electrolytes (anions and cations) and other electrolyte compositions, in a representative embodiment, comprises one or more ionic liquid electrolyte anions, cations and/or other compounds, salts, mixtures, or other anions or cations, for example and without limitation, and may be selected from the group consisting of: butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethyl sulfonyl)imide, 1-hexyl-3-methylimidazolium bis(trifluoromethylsulfonyl)imide, choline bis(trifluoromethylsulfonyl)imide, ethylammonium nitrate, tributylmethylphosphonium methyl sulfate, 1-ethyl-2,3-methylimidazolium tetrafluoroborate, 1-butyl-1-methylpiperidinium iodide, diethylmethylsulfonium bis(trifluoromethylsulfonyl)imide, 1-methyl-3-propylimidazolium iodide, 1-ethyl-3-methylimidazolium thiocyanate, 1-methyl-1-propylpiperidinium bis (trifluoromethylsulfonyl)imide, 1-butyl-2-methylpyridinium bis(trifluoromethylsulfonyl)imide, 1-butyl-4-methylpyridinium bis(trifluoromethyl sulfonyl)imide, 1-butyl-1-methylpyrrolidinium bis(trifluoromethylsulfonyl)imide, diethylmethylsulfonium bis(trifluoromethylsulfonyl)imide; including salts, such as metallic salts such as lithium, zinc, silver, cadmium and nickel of the following: bis(trifluoromethylsulfonyl)imide, tris(pentafluoroethyl)trifluorophosphate, trifluoromethanesulfonate, hexafluorophosphate, tetrafluoroborate, ethyl sulfate, dimethyl phosphate, trifluoromethanesulfonate, triflate, tricyanomethanide, dibutylphosphate; and mixtures thereof.

A particular advantage of using such an ionic liquid electrolyte (anion and/or cation) is its very low vapor pressure, resulting generally in a lack of evaporation at room temperature, fabrication temperatures and operating temperatures, which is very different than typical water-based or solvent-based electrolyte systems.

A representative polymer or polymeric precursor, in a representative embodiment, comprises one or more polymers selected from the group consisting of: polymers (or equivalently, polymeric precursors or polymerizable precursors) such as polyvinyl pyrrolidone ("PVP", also referred to or known as polyvinyl pyrrolidinone), polyvinyl alcohol ("PVA"), polyvinylidene fluoride ("PVFD"), polyvynylidene fluoride-trifluoroethylene, polytetrafluoroethylene ("PTFE"), polydimethylsiloxane, polyethelene, polypropylene, polyethylene oxide, polypropylene oxide, polyethylene glycolhexafluoropropylene, polyethylene terefphtalatpolyacrylonitryle, polyvinylalcogel, polyvinylpyrrolidone, polyvynilchloride, polyvinyl butyral; polyimide polymers and copolymers (including aliphatic, aromatic and semi-aromatic polyimides) such as polyamide, polyaramides, polyacrylamide; acrylate and (meth)acrylate polymers and copolymers such as polymethylmethacrylate, polyacrylonitrile, acrylonitrile butadiene styrene, allylmethacrylate, polyvinylcaprolactam, polystyrene, polybutadiene, polybutylene terephthalate, polycarbonate, polychloroprene, polyethersulfone, nylon, styrene-acrylonitrile resin; clays such as hectorite clays, garamite clays, organo-modified clays; saccharides and polysaccharides such as guar gum, xanthan gum, starch, butyl rubber, agarose, pectin; celluloses and modified celluloses such as hydroxy methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan; fumed silica, silica powders and modified ureas; and mixtures thereof.

A representative liquid or gel separator printable composition (or ink) may further comprise a solvent. In a representative embodiment, the solvent comprises one or more solvents selected from the group consisting of: water; alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; glycols such as ethylene glycols, diethylene glycols, polyethylene glycols, propylene glycols, dipropylene glycols, glycol ethers, glycol ether acetates; carbonates such as propylene carbonate; glycerols and other polyols and polymeric polyols or glycols such as glycerin, diol, triol, tetraol, pentaol, ethylene glycol, 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride; and mixtures thereof. Any of these various solvents may also further comprise an acid or a base (liquid or dissolved solid), such as to adjust overall pH (or pK) or influence another property, including inorganic and/or organic acids such as carboxylic acids (including dicarboxylic acids, tricarboxylic acids, alkyl carboxylic acids, and so on, e.g., dicarboxylic acids such as propanedioic (malonic) acid, butanedioic (succinic) acid, pentanedioic (glutaric) acid, hexanedioic (adipic) acid, heptanedioic (pimelic) acid, octanedioic (suberic) acid, nonanedioic (azelaic) acid, decanedioic (sebacic) acid, undecanedioic acid, dodecanedioic acid, tridecanedioic (brassylic) acid, tetradecanedioic acid, pentadecanedioic acid, hexadecanedioic (thapsic) acid, octadecanedioic acid); acetic acid; oxalic acid; mellitic acid; formic acid; chloroacetic acid; benzoic acid; trifluoroacetic acid; propanoic acid; butanoic acid; hydrochloric acid; sulfuric acid; carbonic acid; and bases such as ammonium hydroxide, sodium hydroxide, potassium hydroxide; and mixtures thereof.

The plurality of particles, in a representative embodiment, comprise one or more particles selected from the group consisting of: glass, alumina, polystyrene, melamine, and mixtures thereof. The plurality of particles, in another representative embodiment, comprise diatoms, diatomaceous frustules, and/or diatomaceous fragments or remains. The plurality of particles, in another representative embodiment, comprise in a cured or solidified form one or more particles selected from the group consisting of: polymers (or equivalently, polymeric precursors or polymerizable precursors) such as polyvinyl pyrrolidone ("PVP", also referred to or known as polyvinyl pyrrolidinone), polyvinyl alcohol ("PVA"), polyvinylidene fluoride ("PVFD"), polyvynylidene fluoride-trifluoroethylene, polytetrafluoroethylene ("PTFE"), polydimethylsiloxane, polyethelene, polypropylene, polyethylene oxide, polypropylene oxide, polyethylene glycolhexafluoropropylene, polyethylene terefphtalatpolyacrylonitryle, polyvinylalcogel, polyvinylpyrrolidone, polyvynilchloride, polyvinyl butyral; polyimide polymers and copolymers (including aliphatic, aromatic and semi-aromatic polyimides) such as polyamide, polyaramides, polyacrylamide; acrylate and (meth)acrylate polymers and copolymers such as polymethylmethacrylate, polyacrylonitrile, acrylonitrile butadiene styrene, allylmethacrylate, polyvinylcaprolactam, polystyrene, polybutadiene, polybutylene terephthalate, polycarbonate, polychloroprene, polyethersulfone, nylon, styrene-acrylonitrile resin; clays such as hectorite clays, garamite clays, organo-modified clays; saccharides and polysaccharides such as guar gum, xanthan gum, starch, butyl rubber, agarose, pectin; celluloses and modified celluloses such as hydroxy methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan; fumed silica, silica powders and modified ureas; and mixtures thereof.

A representative liquid or gel separator printable composition (or ink) and a resulting representative liquid or gel separator may further comprise an additional, second electrolyte different from the first electrolyte, such as an acid, a base, a salt dissolved in a solvent (e.g., water, an organic solvent), or a salt dissolvable or miscible in an ionic liquid, to form free ions. In a representative embodiment, a second electrolyte comprises one or more electrolytes selected from the group consisting of: potassium hydroxide, sodium hydroxide, ammonium hydroxide, lithium hydroxide, nickel hydroxide, cadmium hydroxide, magnesium hydroxide, sulfuric acid, hydrochloric acid, fluoroboric acid, ammonium chloride, zinc chloride, zinc bis(trifluoromethanesulfonyl) imide, aluminium chloride, chromium chloride, magnesium perchloride, barium chromate, lithium chromate, lithiumthyonyl chloride, lithiujm perchlorate, lithium bromide, lithium triflate, lithium hexafluorophosphate, lithium tetrafluoroborate, lithium bis-oxalato borate, lithium bis(trifluoromethanesulfonyl)imide, lithium bisoxalatoborate, lithium iodide, lithium tetrachloroaluminate, potassium carbonate, potassium fluoride, potassium borate, silver nitride, silver tetrafluoroborate; and mixtures thereof.

Another representative embodiment provides a liquid or gel separator for separating and spacing apart at least two conductors, the liquid or gel separator comprising: a plurality of particles having a size (in any dimension) between about 0.5 to about 30 microns, wherein the plurality of particles comprise one or more particles selected from the group consisting of: silicate glass, silicon dioxide, alumina, polystyrene, melamine, diatoms, diatomaceous frustules, diatomaceous fragments, diatomaceous remains; and mixtures thereof; a first, ionic liquid electrolyte; and a polymer.

Another representative embodiment provides a liquid or gel separator for separating and spacing apart at least two conductors, the liquid or gel separator comprising: a plurality of particles; a first, ionic liquid electrolyte; a second electrolyte different from the first electrolyte; and a polymer.

Another representative embodiment provides a liquid or gel separator for separating and spacing apart at least two conductors, the liquid or gel separator comprising: a plurality of substantially spherical particles comprised of silicate glass and having a diameter between about 5.0 to about 15 microns, wherein each substantially spherical particle of the plurality of substantially spherical particles is abutting or within about one diameter of adjacent substantially spherical particles of the plurality of substantially spherical particles; a first electrolyte; and a polymer.

Yet another representative embodiment provides a liquid or gel separator for separating and spacing apart at least two conductors, the liquid or gel separator comprising: a plurality of particles having a size (in any dimension) between about 3.0 to about 15 microns and present in an amount between about 40%-75% by weight, wherein the plurality of particles comprise one or more particles selected from the group consisting of: silicate glass, silicon dioxide, alumina, polystyrene, melamine, diatoms, diatomaceous frustules, diatomaceous fragments, diatomaceous remains; and mixtures thereof; a first, ionic liquid electrolyte; a second electrolyte different from the first electrolyte, wherein the first and second electrolytes comprise zinc tetrafluoroborate salt in 1-ethyl-3-methylimidalzolium tetrafluoroborate ionic liquid and are present in an amount between about 15%-45% by weight; and a polymer comprising polyvinyl alcohol ("PVA") or polyvinylidene fluoride ("PVFD") or mixtures thereof and present in an amount between about 0.5%-15% by weight.

Another representative embodiment provides a printable composition comprising: a plurality of particles; a first, ionic liquid electrolyte; and a polymer or polymeric precursor.

Another representative embodiment provides a printable composition comprising: a plurality of particles having a size (in any dimension) between about 0.5 to about 30 microns, wherein the plurality of particles comprise one or more particles selected from the group consisting of: silicate glass, silicon dioxide, alumina, polystyrene, melamine, diatoms, diatomaceous frustules, diatomaceous fragments, diatomaceous remains; and mixtures thereof; a first, ionic liquid electrolyte; and a polymer or polymeric precursor.

Another representative embodiment provides a printable composition comprising: a plurality of particles; a first, ionic liquid electrolyte; a second electrolyte different from the first electrolyte; and a polymer or polymeric precursor.

Yet another representative embodiment provides a printable composition comprising: a plurality of particles having a size (in any dimension) between about 3.0 to about 15 microns and present in an amount between about 40%-75% by weight, wherein the plurality of particles comprise one or more particles selected from the group consisting of: silicate glass, silicon dioxide, alumina, polystyrene, melamine, diatoms, diatomaceous frustules, diatomaceous fragments, diatomaceous remains; and mixtures thereof; a first, ionic liquid electrolyte; a second electrolyte different from the first electrolyte, wherein the first and second electrolytes comprise zinc tetrafluoroborate salt in 1-ethyl-3-methylimidalzolium tetrafluoroborate ionic liquid and are present in an amount between about 15%-45% by weight; a polymer or polymeric precursor comprising polyvinyl alcohol ("PVA") or polyvinylidene fluoride ("PVFD") or mixtures thereof and present in an amount between about 0.5%-15% by weight; and a solvent comprising N-methyl-2-pyrrolidinone present in an amount between about 15%-25% by weight.

Another representative embodiment provides a composition comprising: a plurality of particles having a size (in any dimension) between about 0.5 to about 50 microns; an ionic liquid electrolyte; and a polymer or polymeric precursor.

Another representative embodiment provides a composition comprising: a plurality of particles selected from the group consisting of: diatoms, diatomaceous frustules, diatomaceous fragments, diatomaceous remains, and mixtures thereof; an ionic liquid electrolyte; and a polymer or polymeric precursor. A method of using such compositions is also disclosed, the method comprising: printing the composition to form a liquid or gel separator.

In addition, another representative embodiment provides a liquid or gel separator for separating and spacing apart at least two conductors, the liquid or gel separator comprising: a plurality of particles selected from the group consisting of: diatoms, diatomaceous frustules, diatomaceous fragments, diatomaceous remains, and mixtures thereof; a first, ionic liquid electrolyte; and a polymer.

Another representative embodiment provides a liquid or gel separator for separating and spacing apart at least two conductors, the liquid or gel separator comprising: a plurality of particles selected from the group consisting of: diatoms, diatomaceous frustules, diatomaceous fragments, diatomaceous remains, and mixtures thereof; a first, ionic liquid electrolyte; a second electrolyte different from the first electrolyte; and a polymer.

Another representative embodiment provides a composition comprising: a plurality of particles selected from the group consisting of: diatoms, diatomaceous frustules, diatomaceous fragments, diatomaceous remains, and mixtures thereof; a first, ionic liquid electrolyte; and a polymer or polymeric precursor.

Another representative embodiment provides a composition comprising: a plurality of particles selected from the group consisting of: diatoms, diatomaceous frustules, diatomaceous fragments, diatomaceous remains, and mixtures thereof; a first, ionic liquid electrolyte; a second electrolyte different from the first electrolyte; and a polymer or polymeric precursor.

Yet another representative embodiment provides a composition comprising: a plurality of particles having a size (in any dimension) between about 0.5 to about 200 microns and present in an amount between about 40%-75% by weight, wherein the plurality of particles comprise one or more particles selected from the group consisting of: diatoms, diatomaceous frustules, diatomaceous fragments, diatomaceous remains, and mixtures thereof; a first, ionic liquid electrolyte; a second electrolyte different from the first electrolyte, wherein the first and second electrolytes comprise zinc tetrafluoroborate salt in 1-ethyl-3-methylimidalzolium tetrafluoroborate ionic liquid and are present in an amount between about 15%-45% by weight; a polymer or polymeric precursor comprising polyvinyl alcohol ("PVA") or polyvinylidene fluoride ("PVFD") or mixtures thereof and present in an amount between about 0.5%-15% by weight; and a solvent comprising N-methyl-2-pyrrolidinone present in an amount between about 15%-25% by weight.

Another representative embodiment provides an energy storage device comprising: a first electrode; a second electrode; and a liquid or gel separator coupled between the first electrode and the second electrode, the liquid or gel separator comprising: a plurality of particles having a size (in any dimension) between about 0.5 to about 30 microns; an ionic liquid electrolyte; and a polymer.

Another representative embodiment provides an energy storage device comprising: a first electrode; a second electrode; and a liquid or gel separator coupled between the first electrode and the second electrode, the liquid or gel separator comprising: a plurality of particles selected from the group consisting of: diatoms, diatomaceous frustules, diatomaceous fragments, diatomaceous remains, and mixtures thereof; an ionic liquid or other electrolyte; and a polymer.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF REPRESENTATIVE EMBODIMENTS

Figure 1:
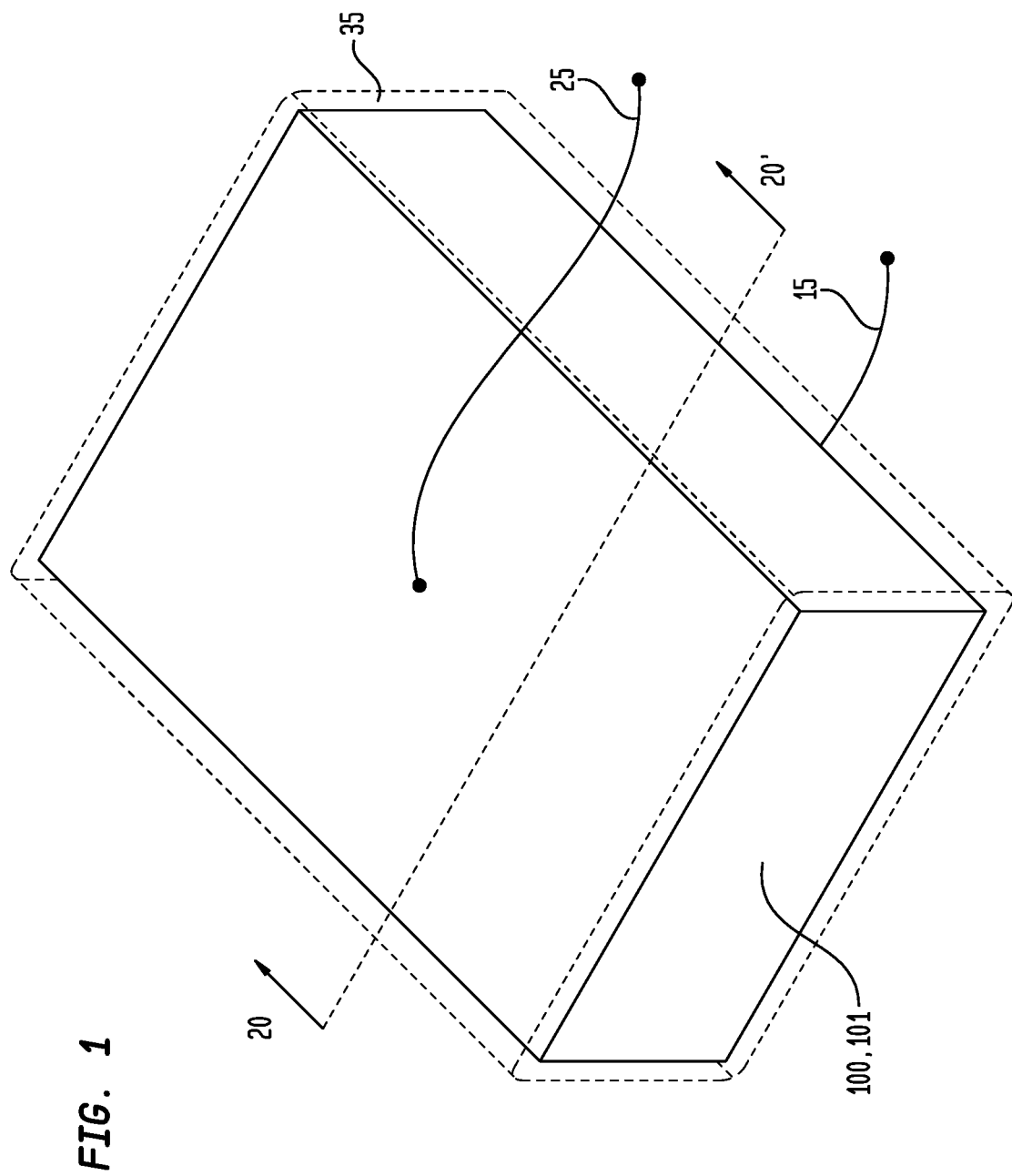
FIG. 1 is a perspective view illustrating a representative energy storage device embodiment in accordance with the teachings of the present disclosure.

While the present disclosure is susceptible of embodiment in many different forms, there are shown in the drawings and will be described herein in detail specific exemplary or representative embodiments thereof, with the understanding that the present description is to be considered as an exemplification of the principles of the disclosure and is not intended to limit the invention or the disclosure to the specific embodiments illustrated. In this respect, before explaining at least one embodiment consistent with the present disclosure in detail, it is to be understood that the disclosure is not limited in its application to the details of construction and to the arrangements of components set forth above and below, illustrated in the drawings, or as described in the examples. Methods and apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

Figure 2:
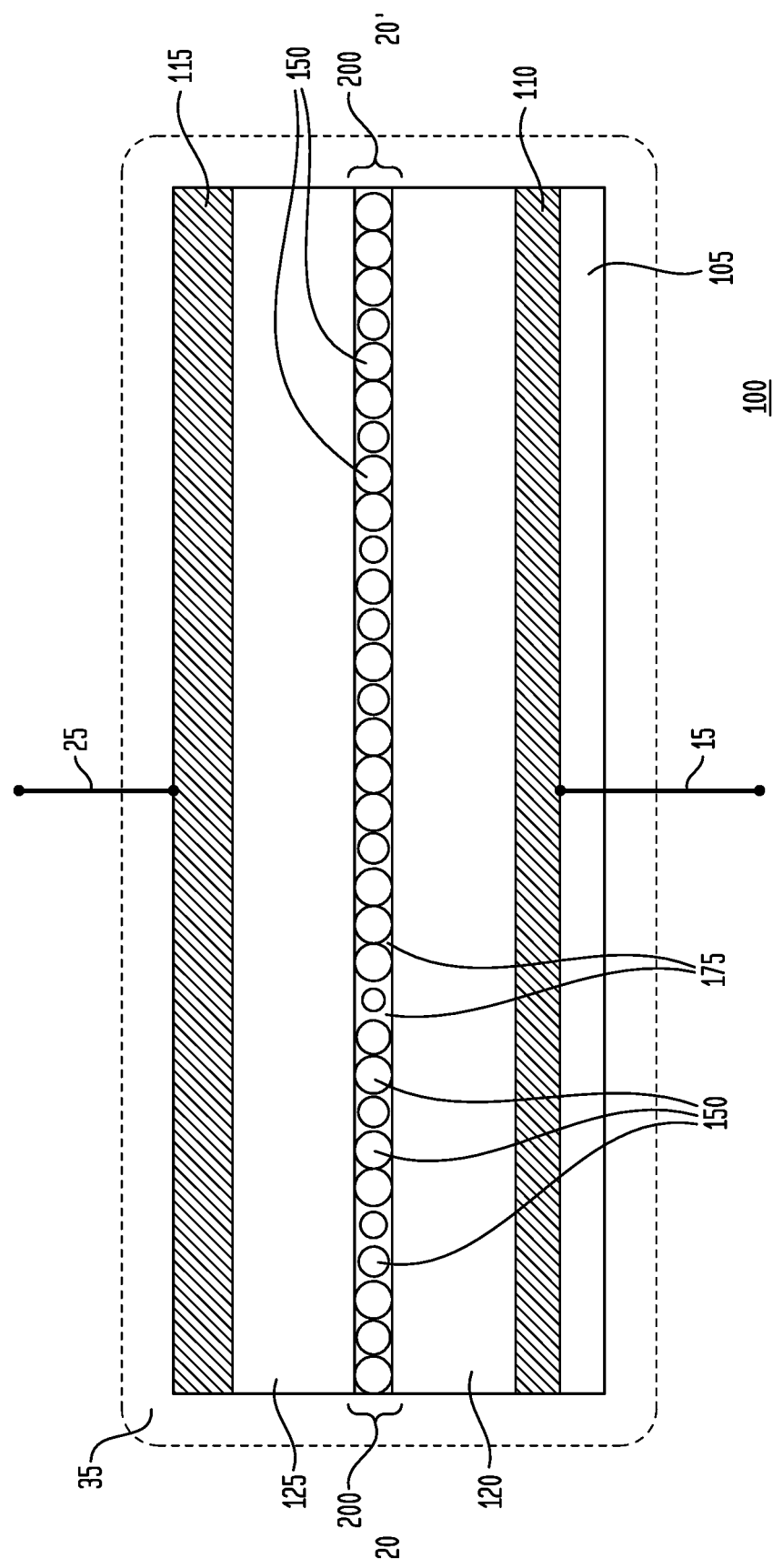
FIG. 2 is a cross-sectional view illustrating a first representative energy storage device embodiment in accordance with the teachings of the present disclosure.
Figure 3:
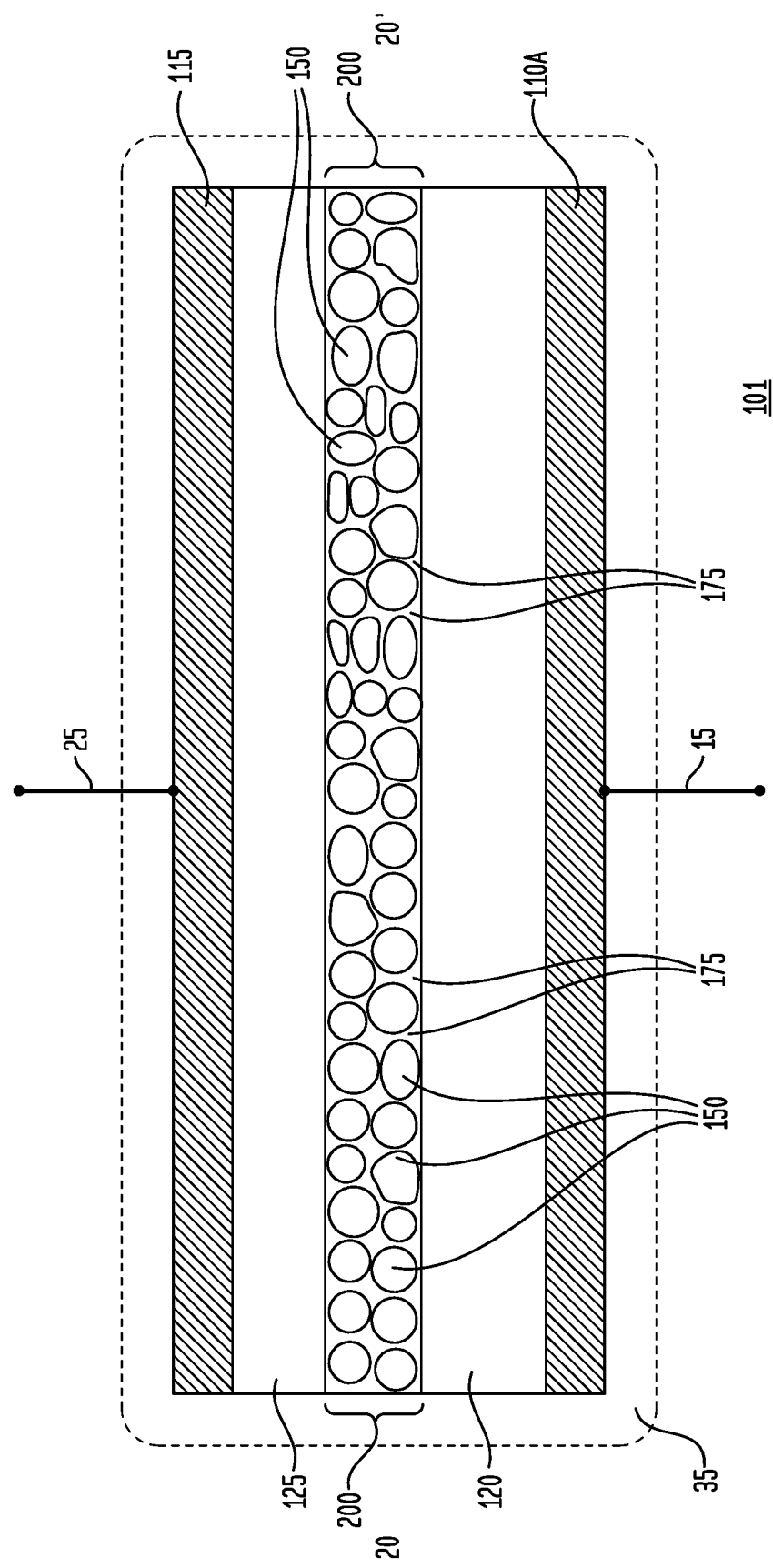
FIG. 3 is a cross-sectional view illustrating a second representative energy storage device embodiment in accordance with the teachings of the present disclosure.

FIG. 1 is a perspective view illustrating representative energy storage device 100, 101 embodiments in accordance with the teachings of the present disclosure, such as a supercapacitor or a battery. FIG. 2 is a cross-sectional view (through the 20-20' plane of FIG. 1) illustrating a first representative energy storage device 100 embodiment, such as a supercapacitor, in accordance with the teachings of the present disclosure. FIG. 3 is a cross-sectional view (through the 20-20' plane of FIG. 1) illustrating a second representative energy storage device 101 embodiment, such as a battery, in accordance with the teachings of the present disclosure. For example and without limitation, such an energy storage device 100, 101 may be a supercapacitor or a battery or another energy storage device, such as any of the representative supercapacitors disclosed in U.S. patent application Ser. No. 13/025,137, filed Feb. 10, 2011, entitled "Multilayer Carbon Nanotube Capacitor" (the "first related patent application"), the entire contents of which are incorporated herein by reference with the same full force and effect as if set forth in their entirety herein, and with priority claimed for all commonly disclosed subject matter. As illustrated, such a representative energy storage device 100, 101 is sealed or encapsulated with a sealant 35, to both provide electrical insulation and to prevent leakage of internal contents or components, such as liquids (e.g., ionic liquids) and other components such as carbon nanotubes ("CNTs") (such as single-walled carbon nanotubes ("SW-CNTs") and multi-walled carbon nanotubes ("MWCNTs")), also for example and without limitation. Any type of suitable sealant which is known or becomes known in the art may be utilized to form sealant 35, such as the various polymers discussed below.

Also as illustrated, external leads (or wires) 15, 25 are typically provided for electrical contact with the corresponding first and second conductors (or conductive layers) 110 (or 110A), 115 (discussed in greater detail below, and which may also be referred to equivalently as first and second electrodes 110 (or 110A), 115 or equivalently as first and second current collectors 110 (or 110A), 115), depending upon the embodiment (e.g., typically referred to as current collectors in a battery embodiment). The sealant 35 and leads 15, 25 may be provided as known or becomes known in the electronic arts. A representative energy storage device 100, 101 may be fabricated, stacked and/or wired in parallel or in series, and may perform as a supercapacitor, a battery, or a battery replacement, or as a fixed electrical "buffer" storage for distributed power systems, for example and without limitation. A representative energy storage device 100, 101 is illustrated as having a substantially flat form factor for ease of explanation, and those having skill in the electronic arts will understand that a representative energy storage device 100, 101 may have any of various forms, thicknesses, and form factors, such as cubic, rolled, folded, etc., and any and all such shapes and sizes are considered equivalent and within the scope of the disclosure. For example and as discussed in greater detail below, a representative energy storage device 100, 101 may be formed through a printing process on comparatively large, flexible sheets of a substrate 105 or on a conductive substrate utilized to form first conductor 110A, such that a representative energy storage device 100, 101 may also be flexible or foldable (even creasable) and formed into a wide variety of shapes and form factors for any intended purpose.

The first conductor 110 is illustrated as coupled to a substrate 105. In any of various exemplary embodiments, the first conductor 110 and the substrate 105 may be separate components or may be formed as a combined or integrated conductive substrate, illustrated as first conductor (or conductive layer) 110A in FIG. 3. For example, a first conductor (or conductive layer) 110 may be printed on a flexible substrate 105, such as illustrated in FIG. 2, or a first conductor (or conductive layer) 110A may be comprised of a conductive substrate, such as an aluminum foil or sheet (which may or may not have another conductive layer deposited thereon), forming an integrated or combined first conductor 110A as illustrated in FIG. 3. The embodiments 100, 101 differ with respect to the use of a conductive substrate to form the first conductor 110A (versus a separate substrate 105 and first conductor 110). In addition, the embodiments 100, 101 of FIGS. 2 and 3 also illustrate, as representative examples, different shapes, packing densities, number of layers and size distributions for a plurality of particles 155, and different form factors (e.g., thicknesses) for an exemplary liquid or gel separator 200. Except for these differences, the illustrated embodiments 100, 101 are otherwise structurally substantially similar (if not identical) in other respects for either a battery embodiment or a supercapacitor embodiment, it being understood, of course, that a battery or supercapacitor generally will have differing compositions comprising each such layer illustrated, as discussed in greater detail below. (Not separately illustrated, depending upon the order of fabrication of the various layers and the method of fabrication, the second conductor 115 also may be formed as a combined or integrated conductive substrate.)

Layers 120 and 125 comprise any desired chemical composition, electrochemical composition or any other composition suitable for energy storage, such as a composition of CNTs and ionic liquid electrolytes for a supercapacitor as disclosed in the first related patent application, and depending upon the embodiment, may form anode and cathode layers. In another representative or exemplary embodiment, such as for a battery, the layers 120 and 125 may comprise zinc-carbon or zinc-silver oxide, for example and without limitation, forming an anode and a cathode, as described in greater detail below. Depending upon the selected embodiment, the first conductor 110, 110A alone, layer 120 alone, or the first conductor 110, 110A coupled with layer 120, may be considered a first electrode (e.g., an anode), and correspondingly the second conductor 115 alone, layer 125 alone, or the second conductor 115 coupled with layer 125, may be considered a second electrode (e.g., a cathode).

The first conductor 110, 110A and layer 120 (e.g., anode) are separated from the second electrode 115 and layer 125 (e.g., cathode) by a liquid or gel separator 200 formed from an exemplary liquid or gel separator printable composition (ink) of the present disclosure. (In various other exemplary embodiments, it is possible that the compositions which would otherwise be utilized to form layers 120, 125 (such as an ionic liquid electrolyte) may be included within liquid or gel separator 200 and, for such embodiments, layers 120, 125 may be omitted as separate or discrete components of a representative energy storage device 100, 101.)

In various exemplary embodiments, the first conductor 110, 110A and the second conductor 115 may be configured as parallel plates or sheets (prior to further configuration, such as folding or rolling), each having a substantially flat form factor, and may be flexible or nonflexible. In other exemplary embodiments, the first conductor 110, 110A and the second conductor 115 may each be fan-folded and may be flexible or nonflexible. A representative energy storage device 100, 101 also may have any of various overall, resulting shapes, sizes, and form factors, such as by further folding or rolling of the opposing electrodes (with their sandwiched contents, the layers 120, 125 on each side of the gel separator 200).

For completeness, it should be noted that a representative energy storage device 100, 101 is effectively comprised of two, mirror image halves, with one half having the first conductor 110, 110A with layer 120 and the other half having the second conductor 115 with layer 125. One such half may be fabricated identically to the first such half, and then placed (upside down or face down, effectively as a mirror image) over the first such half and additional components (layers 120, 125 and/or liquid or gel separator 200), such as by folding or lamination.

In an exemplary embodiment, each of these various layers is printed or otherwise deposited successively, printing or depositing a next layer over the previously printed layers. For example and without limitation, the first conductor 110 may be printed or otherwise deposited over substrate 105; layer 120 may be printed or otherwise deposited over the first conductor 110 (or 110A); the liquid or gel separator 200 may be printed or otherwise deposited over layer 120; the layer 125 may be printed or otherwise deposited over the liquid or gel separator 200; and the second conductor 115 may be printed or otherwise deposited over the layer 125. This may be performed in line and without lamination or folding, which provides for much higher throughput and lower fabrication costs. This is a significant departure from prior art methods which, at a minimum, require separate placement and/or lamination steps for a separation membrane.

Depending upon the viscosity and temperature, the liquid or gel separator 200 may be referred to equivalently as a liquid separator or as a gel separator, and any reference to liquid or gel herein shall be understood to mean and include the other. It should also be noted that all described percentages are based on weight, rather than volume or some other measure.

Liquid or Gel Separator Printable Composition Example 1:

A composition comprising:
a plurality of particles;
an ionic liquid electrolyte; and
a polymer or polymeric precursor.

Liquid or Gel Separator Printable Composition Example 2:

A composition comprising:
a plurality of particles;
a first electrolyte comprising an ionic liquid;
a second electrolyte different from the first electrolyte; and
a polymer or polymeric precursor.

Liquid or Gel Separator Printable Composition Example 3:

A composition comprising:
a plurality of particles having a size (in any dimension) between about 0.5 to about 30 microns;
an ionic liquid electrolyte; and
a polymer or polymeric precursor.

Liquid or Gel Separator Printable Composition Example 4:

A composition comprising:
a plurality of particles having a size (in any dimension) between about 0.5 to about 30 microns and comprised of silicate glass;
an ionic liquid electrolyte; and
a polymer or polymeric precursor.

Liquid or Gel Separator Printable Composition Example 5:

A composition comprising:
a plurality of particles having a size (in any dimension) between about 0.5 to about 30 microns and comprised of a first polymer;
an ionic liquid electrolyte; and
a second polymer or polymeric precursor, which may be the same or different from the first polymer.

Liquid or Gel Separator Printable Composition Example 6:

A composition comprising:
a plurality of particles selected from the group consisting of: diatoms, diatomaceous frustules, diatomaceous fragments, diatomaceous remains, and mixtures thereof;
an ionic liquid electrolyte; and
a polymer or polymeric precursor.

Liquid or Gel Separator Printable Composition Example 7:
A composition comprising:
about 10%-90% of a plurality of particles having a size (in any dimension) between about 0.5 to about 30 microns;
about 1%-90% of an ionic liquid electrolyte; and
about 0.5%-90% of a polymer or polymeric precursor.

Liquid or Gel Separator Printable Composition Example 8:
A composition comprising:
about 30%-80% of a plurality of particles having a size (in any dimension) between about 0.5 to about 30 microns;
about 5%-50% of an ionic liquid electrolyte; and
about 1%-20% of a polymer or polymeric precursor.

Liquid or Gel Separator Printable Composition Example 9:
A composition comprising:
about 40%-60% of a plurality of particles having a size (in any dimension) between about 0.5 to about 30 microns;
about 15%-30% of an ionic liquid electrolyte; and
about 1%-10% of a polymer or polymeric precursor.

Liquid or Gel Separator Printable Composition Example 10:
A composition comprising:
a plurality of particles;
an ionic liquid electrolyte;
a polymer or polymeric precursor; and
a solvent.

Liquid or Gel Separator Printable Composition Example 11:
A composition comprising:
a plurality of particles;
a first electrolyte comprising an ionic liquid;
a second electrolyte different from the first electrolyte;
a polymer or polymeric precursor; and
a solvent.

Liquid or Gel Separator Printable Composition Example 12:
A composition comprising:
a plurality of particles;
an ionic liquid electrolyte;
a polymer or polymeric precursor; and
a viscosity modifier.

Liquid or Gel Separator Printable Composition Example 13:
A composition comprising:
a plurality of substantially spherical particles having a size (in any dimension) between about 5.0 to about 15 microns and comprised of silicate glass;
a first, ionic liquid electrolyte; and
a polymer or polymeric precursor.

Liquid or Gel Separator Printable Composition Example 14:
A composition comprising:
a plurality of substantially spherical particles having a size (in any dimension) of about 10μ±2μ and comprised of silicate glass;
a first, ionic liquid electrolyte; and
a polymer or polymeric precursor.

Liquid or Gel Separator Printable Composition Example 15:
A composition comprising:
a plurality of particles having a size (in any dimension) between about 5.0 to about 15 microns and comprised of silicate glass;
first and second electrolytes comprising zinc tetrafluoroborate salt in 1-ethyl-3-methylimidalzolium tetrafluoroborate ionic liquid;
a polymer or polymeric precursor comprising polyvinyl alcohol ("PVA") or polyvinylidene fluoride ("PVFD"); and
a solvent comprising N-methyl-2-pyrrolidinone.

Liquid or Gel Separator Printable Composition Example 16:
A composition comprising:
about 40%-60% of a plurality of particles having a size (in any dimension) between about 5.0 to about 15 microns and comprised of silicate glass;
about 15%-30% of first and second electrolytes comprising zinc tetrafluoroborate salt in 1-ethyl-3-methylimidalzolium tetrafluoroborate ionic liquid;
about 0.5%-10% of a polymer or polymeric precursor comprising polyvinyl alcohol ("PVA") or polyvinylidene fluoride ("PVFD"); and
about 10%-30% of a solvent comprising N-methyl-2-pyrrolidinone.

Liquid or Gel Separator Printable Composition Example 17:
A composition comprising:
about 50%-55% of a plurality of particles having a size (in any dimension) between about 5.0 to about 15 microns and comprised of silicate glass;
about 22%-27% of first and second electrolytes comprising zinc tetrafluoroborate salt in 1-ethyl-3-methylimidalzolium tetrafluoroborate ionic liquid;
about 1.0%-5.0% of a polymer or polymeric precursor comprising polyvinyl alcohol ("PVA") or polyvinylidene fluoride ("PVFD"); and
about 15%-25% of a solvent comprising N-methyl-2-pyrrolidinone.

Liquid or Gel Separator Printable Composition Example 18:
A composition comprising:
about 52%-53% of a plurality of particles having a size (in any dimension) between about 5.0 to about 15 microns and comprised of silicate glass;
about 24%-26% of first and second electrolytes comprising zinc tetrafluoroborate salt in 1-ethyl-3-methylimidalzolium tetrafluoroborate ionic liquid;
about 2.0%-3.5% of a polymer or polymeric precursor comprising polyvinyl alcohol ("PVA") or polyvinylidene fluoride ("PVFD"); and
about 19%-21% of a solvent comprising N-methyl-2-pyrrolidinone.

Referring to the examples and to the Figures, in representative or exemplary embodiments, the liquid or gel separator 200 is typically formed using a representative or exemplary liquid or gel separator printable composition which has been deposited as a layer over a layer 120 (or 125, if deposited in a reverse order), such as through a printing or other deposition process, as mentioned above and as further described below. Following curing or drying of the liquid or gel separator printable composition, the resulting liquid or gel separator 200 comprises a liquid or gel polymeric mixture 175 and particles 150, and in turn, the liquid or gel polymeric mixture 175 comprises an ionic liquid electrolyte and a polymer (e.g., formed from a polymerized or cured polymeric precursor), and optionally may include other components as necessary or desirable, such as additional electrolytes or trace amounts of solvents, for example and without limitation.

Liquid or Gel Separator 200 Example 1:
A composition comprising:
a plurality of particles;
an ionic liquid electrolyte; and
a polymer.

Liquid or Gel Separator 200 Example 2:
A composition comprising:
a plurality of particles;
a first electrolyte comprising an ionic liquid;
a second electrolyte different from the first electrolyte; and
a polymer.

Liquid or Gel Separator 200 Example 3:
A composition comprising:
a plurality of particles having a size (in any dimension) between about 0.5 to about 30 microns;
an ionic liquid electrolyte; and
a polymer.

Liquid or Gel Separator 200 Example 4:
A composition comprising:
a plurality of particles having a size (in any dimension) between about 0.5 to about 30 microns and comprised of silicate glass;
an ionic liquid electrolyte; and
a polymer.

Liquid or Gel Separator 200 Example 5:
A composition comprising:
a plurality of particles selected from the group consisting of: diatoms, diatomaceous frustules, diatomaceous fragments, diatomaceous remains, and mixtures thereof;
an ionic liquid electrolyte; and
a polymer.

Liquid or Gel Separator 200 Example 6:
A composition comprising:
a plurality of particles having a size (in any dimension) between about 0.5 to about 30 microns and comprised of a first polymer;
an ionic liquid electrolyte; and
a second polymer, which may be the same or different from the first polymer.

Liquid or Gel Separator 200 Example 7:
A composition comprising:
a plurality of substantially spherical particles having a size (in any dimension) between about 5.0 to about 15 microns and comprised of silicate glass, each substantially spherical particle abutting or separated by less than about one diameter from another adjacent substantially spherical particle of the plurality of substantially spherical particles;
a first, ionic liquid electrolyte; and
a polymer.

Liquid or Gel Separator 200 Example 8:
A composition comprising:
a plurality of substantially spherical particles having a size (in any dimension) between about 5.0 to about 15 microns and comprised of silicate glass, each substantially spherical particle abutting or separated by less than about one diameter from another adjacent substantially spherical particle of the plurality of substantially spherical particles, and the plurality of substantially spherical particles packed or arranged substantially in a monolayer;
a first, ionic liquid electrolyte; and
a polymer.

Liquid or Gel Separator 200 Example 9:
A composition comprising:
a plurality of substantially spherical particles having a size (in any dimension) of about $10\mu \pm 2\mu$ and comprised of silicate glass, each substantially spherical particle abutting or separated by less than about one diameter from another adjacent substantially spherical particle of the plurality of substantially spherical particles, and the plurality of substantially spherical particles packed or arranged substantially in a monolayer;
a first, ionic liquid electrolyte; and
a polymer.

Liquid or Gel Separator 200 Example 10:
A composition comprising:
a plurality of substantially spherical particles having a size (in any dimension) between about 5.0 to about 15 microns and comprised of silicate glass, each substantially spherical particle abutting or separated by less than about one diameter from another adjacent substantially spherical particle of the plurality of substantially spherical particles, and the plurality of substantially spherical particles packed or arranged substantially in two or fewer layers;
a first, ionic liquid electrolyte; and
a polymer.

Liquid or Gel Separator 200 Example 11:
A composition comprising:
about 10%-90% of a plurality of particles having a size (in any dimension) between about 0.5 to about 30 microns;
about 1%-90% of an ionic liquid electrolyte; and
about 0.5%-90% of a polymer.

Liquid or Gel Separator 200 Example 12:
A composition comprising:
about 30%-80% of a plurality of particles having a size (in any dimension) between about 0.5 to about 30 microns;
about 5%-50% of an ionic liquid electrolyte; and
about 1%-20% of a polymer.

Liquid or Gel Separator 200 Example 13:
A composition comprising:
about 40%-60% of a plurality of particles having a size (in any dimension) between about 0.5 to about 30 microns;
about 15%-30% of an ionic liquid electrolyte; and
about 1%-10% of a polymer.

Liquid or Gel Separator 200 Example 14:
A composition comprising:
a plurality of particles;
an ionic liquid electrolyte;
a polymer; and
at least trace amounts of a solvent.

Liquid or Gel Separator 200 Example 15:
A composition comprising:
a plurality of particles;
a first electrolyte comprising an ionic liquid;
a second electrolyte different from the first electrolyte;
a polymer; and
at least trace amounts of a solvent.

Liquid or Gel Separator 200 Example 16:
A composition comprising:
a plurality of particles;
an ionic liquid electrolyte;
a polymer; and
at least trace amounts of a viscosity modifier.

Liquid or Gel Separator 200 Example 17:
A composition comprising:
a plurality of particles having a size (in any dimension) between about 5.0 to about 15 microns and comprised of silicate glass;
first and second electrolytes comprising zinc tetrafluoroborate salt in 1-ethyl-3-methylimidalzolium tetrafluoroborate ionic liquid; and
a polymer comprising polyvinyl alcohol ("PVA") or polyvinylidene fluoride ("PVFD").

Liquid or Gel Separator 200 Example 18:
A composition comprising:
about 40%-75% of a plurality of particles having a size (in any dimension) between about 5.0 to about 15 microns and comprised of silicate glass;
about 15%-45% of first and second electrolytes comprising zinc tetrafluoroborate salt in 1-ethyl-3-methylimidalzolium tetrafluoroborate ionic liquid; and
about 0.5%-15% of a polymer comprising polyvinyl alcohol ("PVA") or polyvinylidene fluoride ("PVFD").

Liquid or Gel Separator 200 Example 19:
A composition comprising:
a plurality of particles having a size (in any dimension) between about 5.0 to about 15 microns and comprised of silicate glass;
first and second electrolytes comprising zinc tetrafluoroborate salt in 1-ethyl-3-methylimidalzolium tetrafluoroborate ionic liquid;
a polymer comprising polyvinyl alcohol ("PVA") or polyvinylidene fluoride ("PVFD"); and
at least trace amounts of a solvent comprising N-methyl-2-pyrrolidinone.

Liquid or Gel Separator 200 Example 20:
A composition comprising:
about 40%-75% of a plurality of particles having a size (in any dimension) between about 5.0 to about 15 microns and comprised of silicate glass;
about 15%-45% of first and second electrolytes comprising zinc tetrafluoroborate salt in 1-ethyl-3-methylimidalzolium tetrafluoroborate ionic liquid;
about 0.5%-15% of a polymer comprising polyvinyl alcohol ("PVA") or polyvinylidene fluoride ("PVFD"); and
at least trace amounts of a solvent comprising N-methyl-2-pyrrolidinone.

Solid, hollow, open or dense particles 150 may be spherical, substantially spherical, near spherical, or may have other shapes and forms, such as faceted, oblong (elliptical), substantially rectangular, substantially flat, or substantially irregular or aspherical particles, any organic shapes (e.g., any of the various shapes of diatoms, diatomaceous frustules, and/or diatomaceous fragments or remains), cubic, or various prismatic shapes (e.g., trapezoidal, triangular, pyramidal, etc.), and are comprised of any substantially nonconductive or otherwise electrically insulating materials like glass, alumina, polystyrene, melamine, organic materials, natural materials, etc. Typical or representative sizes of particles 150 are about 0.5 to about 50 microns, or more particularly between about 0.5 to about 30 microns, or more particularly between about 2.0 to about 20 microns, or more particularly between about 4.0 to about 15 microns, or more particularly between about 5.0 to about 15 microns, or more particularly between about 5.0 to about 10 microns, or more particularly between about 6.0 to about 8.0 microns. In a representative embodiment, silicate glass or plastic spheres are utilized to form particles 150, such as a borosilicate glass or other silicate glass, or a plastic or other polymer such as polystyrene latex, although any of myriad types of materials may be utilized, including without limitation, other types of glass, plastic, other polymers, crystals or polycrystalline silicate glass, and/or mixes of different types of materials, in any shape. Also for example, the particles 150 may be comprised of any of the various polymers described below, in a cured or solidified form.

In another representative or exemplary embodiment, diatoms, diatomaceous frustules, and/or diatomaceous fragments or remains are utilized to form particles 150, e.g., the cell walls (frustules) and frustule fragments of diatoms are utilized to form particles 150 and, accordingly, any reference to a diatom should be understood to mean and include the frustule or cell wall of a diatom, which is generally comprised of a form of silica, and/or any other diatomaceous fragments or remains, of any shape or morphology. Diatoms are a major group of algae, are one of the most common types of phytoplankton, and may be considered a class (usually called Diatomophyceae) or a division or phylum (usually called Bacillariophyta, Bacillariophyceae, and/or Heterokontophyta), and all such orders, classes, divisions or phyla are considered within the scope of the disclosure. Most diatoms are unicellular, although they can exist as colonies in the shape of filaments or ribbons (e.g. Fragilaria), fans (e.g. Meridion), zigzags (e.g. Tabellaria), or stellate colonies (e.g. Asterionella). A typical feature of diatom cells is that they are encased within a cell wall made of silica (hydrated silicon dioxide) called a frustule. These frustules show a wide diversity in form, but usually consist of two asymmetrical sides with a split between them, hence the group name. Any and all types (over about 200 genera and 100,000 species) of diatoms may be utilized as particles 150 including, for example and without limitation, centric diatoms (Centrales), pennate diatoms (Pennales) (with or without a raphe), and any and all diatoms, frustules, and/or diatomaceous fragments or remains are within the scope of the disclosure and are individually and collectively referred to herein as "diatoms".

It should also be noted that such diatoms may be available in a wide variety of sizes, including sizes greater than about 30 microns, and all such sizes of diatoms are within the scope of the disclosure. For example, in another representative embodiment, the plurality of particles are selected from the group consisting of: diatoms, diatomaceous frustules, diatomaceous fragments, diatomaceous remains, and mixtures thereof. For such an exemplary embodiment, the plurality of particles have a size (in any dimension) between about 0.5 to about 200 microns, or more particularly between about 2.0 to about 100 microns, or more particularly between about 2.0 to about 50 microns, or more particularly between about 4.0 to about 30 microns, or more particularly between about 5.0 to about 30 microns. For example and without limitation, a representative diatom, diatomaceous frustule, diatomaceous fragment or other diatomaceous remains may have a size on the order of about 5 microns in diameter and about 20-30 microns in length.

Also in a representative embodiment, for any selected size of a particle 150, there may be a comparatively narrow distribution or variance of diameter sizes, such as for a substantially spherical particle, to facilitate comparatively dense packing of the particles 150 in a liquid or gel separator 200. For example and without limitation, for a 10 micron selected particle size, it may be advantageous for the particles to be within a 2 micron variance, e.g., $10\mu \pm 2\mu$, and multiple comparatively narrow ranges are also within the scope of the disclosure, such as $7\mu$ $2\mu$, $10\mu$, $\pm 15\mu$, $3\mu$, $12\mu$, $1.5\mu$, and so on.

In another representative embodiment, the particles are packed in one or more layers, generally to be touching or abutting any adjacent particles and, when not abutting, to be within a distance of about a one particle diameter (for the selected size of the particles 150) from its neighbors or more specifically, from adjacent particles. In an exemplary embodiment, the plurality of particles 150 are substantially spherical and densely packed in a monolayer, or a bilayer, or something in between, to provide a liquid or gel separator 200 having a thickness of 1-2 particle diameters for the selected size of the particles 150, e.g., a thickness of 1.5 particle diameters. In other exemplary embodiments, additional particle layers may also be utilized, such as an exemplary liquid or gel separator 200 comprised of 3-6 layers of particles 150, also for example and without limitation.

The particles 150 and arrangement of particles 150 illustrated in FIG. 2 reflect these additional considerations, and are illustrated as substantially spherical particles, with very little variance of diameters, are comparatively densely packed to be either abutting or within one particle diameter of each other, and packed or arranged in a monolayer, i.e., the liquid or gel separator 200 has a thickness of about one particle 150 diameter and any additional liquid or gel polymeric mixture 175.

In contrast, the particles 150 and arrangement of particles 150 illustrated in FIG. 3 reflect considerably more variation, in size, shape, diameters, packing density, and arrangement into layers (shown as two and three layers within the same liquid or gel separator 200). For example, such variations may be found or expected when naturally occurring particles 150 are utilized, such as diatoms, diatomaceous frustules, diatomaceous fragments, diatomaceous remains, and mixtures thereof.

In addition, not separately illustrated in FIGS. 2 and 3, multiple printed layers a liquid or gel separator printable composition may be utilized to form a liquid or gel separator 200.

It should be noted that the micro (sub-millimeter) size of the particles 150, namely, microparticle sizes ranging substantially from about 0.5 to 50 microns (or diatoms, diatomaceous frustules, diatomaceous fragments, diatomaceous remains, and mixtures thereof generally ranging from about 5 to about 200 microns), along with the dense and abutting packing of the particles in the liquid or gel separator 200, is a substantial departure from prior art membrane separators, such as those using significantly larger and regularly spaced-apart particles.

Representative diatoms, diatomaceous frustules, diatomaceous fragments, and diatomaceous remains have been obtained and are generally available from Continental Chemical USA of Fort Lauderdale, Fla., US, and from Lintech International LLC of Macon, Ga., US. Representative substantially spherical particles comprised of silicate glass have been obtained and are generally available from Potter Industries of Brownwood, Tex., US.

It should also be noted that using diatoms (including diatomaceous frustules, diatomaceous fragments, diatomaceous remains, and mixtures thereof) to form particles 150 provides serendipitous and unexpected results, as such diatoms (including diatomaceous frustules, diatomaceous fragments, diatomaceous remains, and mixtures thereof) are not generally used in electronic devices such as batteries and supercapacitors. The diatoms, diatomaceous frustules, diatomaceous fragments, and diatomaceous remains are comparatively very hard and structurally sound, and can withstand the compressive and other forces exerted in a deposition process such as printing. The diatoms, diatomaceous frustules, diatomaceous fragments, and diatomaceous remains are electrically nonconductive, comparatively inexpensive, and highly porous (nanoporous), allowing and facilitating the movement or flow of one or more ionic liquid and other electrolytes during charging and discharging cycles.

The particles 150 prevent electrical contact between first conductor 110, 110A and second conductor 115, and generally further prevent electrical contact between layers 120 and 125 (which, for example, may function as anode and cathode of a battery). The rigidity of particles 150 makes it possible to print a next layer on a printed liquid or gel separator 200 by pressure applied techniques (like screen printing) without creating an electrical short in the representative energy storage device 100, 101. As previously mentioned, the representative energy storage device 100, 101 may be printed in line, adding layers successively, without folding or lamination, for example. The polymer gel with one or more embedded ionic liquids and/or other electrolyte provides ionic conductivity. The ionic conductance will be realized through the liquid or gel polymeric mixture 175 as well as on the exterior and/or interior (such as for diatoms) surfaces of particles 150.

Ionic liquids are molten salts that at room temperature have immeasurably low vapor pressure, are non-flammable, have high ionic conductivity, have a wide range of thermal and electrochemical stabilities. More generally, an ionic liquid is any of one or more organic molten salts which substantially consist only of ions and are liquid at temperatures below about 100° C. An ionic liquid is highly suitable for deposition through printing, as they are non-volatile at room temperatures. An ionic liquid may be selected based upon stability over time and temperature, a comparatively wide electrochemical window or decomposition voltage, comparatively high conductivity, capability to disperse CNTs, a lack of corrosiveness (for other components, such as conductors), purity, and aprotic characteristics (to avoid hydrogen ion discharge at the cathodes). Representative ionic liquids utilized herein form ion conducting gels with polymers when mixing or after polymerization of monomers in an ionic liquid media.

Ionic liquid cations are mostly organic and can be classified as ammonium-based, imidazolium-based, piperidinium-based, pyridinium-based, pyrrolidinium-based, phosphonium-based, sulphonium-based, etc. based. Ionic liquid anions can be inorganic like tetrafluoroborate-based, hexafluorophosphate-based, chloride-based, nitrate-based, sulphate-based, etc. and organic like acetate-based, (triflluoromethylsulfonyl)imide-based, triflate-based, etc. Any and all ionic liquids are within the scope of the disclosure.

The ionic liquid electrolyte, in a representative embodiment, comprises a combination of one or more types of ionic liquid cations and/or one or more types of ionic liquid anions, and there may be a wide variety of any such combinations of ionic liquid anions and/or cations. In addition, any selected ionic liquid cation or ionic liquid anion may be paired with any other type of ion (anion or cation respectively) which is not an ionic liquid electrolyte, including any another type of anion or cation, such as a salt dissolved in water or another solvent or a salt of an ionic liquid, e.g., lithium bis(trifluoromethylsulfonyl)imide, also for example and without limitation. For example and without limitation, a selected ionic liquid electrolyte combination may include an ionic liquid cation, an ionic liquid anion, a selected salt and a solvent. Also for example and without limitation, a selected ionic liquid electrolyte combination may include an ionic liquid cation or anion and an anion or cation which is not an ionic liquid, such as lithium bis(trifluoromethylsulfonyl)imide mentioned above.

In a representative embodiment, for example and without limitation, a representative ionic liquid cation may be selected from the group consisting of: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and mixtures thereof.

Also for example and without limitation, a representative ionic liquid anion or other type of anion may be selected from the group consisting of: tris(pentafluoroethyl)trifluorophosphate, trifluoromethanesulfonate, hexafluorophosphate, tetrafluoroborate, ethyl sulfate, methyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, thiocyanate, and mixtures thereof.

Continuing with the examples, a representative combination of ionic liquid electrolytes (anions and cations) and other electrolyte compositions, in a representative embodiment, comprises one or more ionic liquid electrolyte anions, cations and/or other compounds, salts, mixtures, or other anions or cations, for example and without limitation, and may be selected from the group consisting of: butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethyl sulfonyl)imide, 1-hexyl-3-methylimidazolium bis(trifluoromethylsulfonyl)imide, choline bis(trifluoromethylsulfonyl)imide, ethylammonium nitrate, tributylmethylphosphonium methyl sulfate, 1-ethyl-2,3-methylimidazolium tetrafluoroborate, 1-butyl-1-methylpiperidinium iodide, diethylmethylsulfonium bis(trifluoromethylsulfonyl)imide, 1-methyl-3-propylimidazolium iodide, 1-ethyl-3-methylimidazolium thiocyanate, 1-methyl-1-propylpiperidinium bis(trifluoromethylsulfonyl)imide, 1-butyl-2-methylpyridinium bis(trifluoromethylsulfonyl)imide, 1-butyl-4-methylpyridinium bis(trifluoromethylsulfonyl)imide, 1-butyl-1-methylpyrrolidinium bis(trifluoromethylsulfonyl)imide, diethylmethylsulfonium bis(trifluoromethylsulfonyl)imide, including salts, such as metallic salts such as lithium, zinc, silver, cadmium and nickel of the following: bis(trifluoromethylsulfonyl)imide, tris(pentafluoroethyl)trifluorophosphate, trifluoromethanesulfonate, hexafluorophosphate, tetrafluoroborate, ethyl sulfate, dimethyl phosphate, trifluoromethanesulfonate, triflate, tricyanomethanide, dibutylphosphate, and mixtures thereof. Other ionic liquids as utilized in the electronic and electrochemical arts may also be suitable, and are considered equivalent and within the scope of the disclosure.

Ionic liquids used in supercapacitors, for example and without limitation, may be 1-ethyl-3-methylimidazolium bis(trifluoromethylsulfonyl)imide, and/or 1-ethyl-3-methylimidazolium ethyl sulfate. Ionic liquids used for batteries, also for example and without limitation, may be 1-ethyl-3-methylimidazolium tetrafluoroborate, tributyl(tetradecyl)phosphonium methansulfonate, and/or trihexyl (tetradecyl) phosphonium bis(trifluoromethylsulfonyl)imide. Also for example and without limitation, 1-ethyl-3-methylimidazolium tetrafluoroborate may be used in a zinc-carbon battery and tributyl(tetradecyl)phosphonium methansulfonate, trihexyl (tetradecyl) phosphonium bis(trifluoromethylsulfonyl)imide may be used for zinc-silver oxide batteries. Representative ionic liquids may be obtained from IoLiTec Ionic Liquids Technologies GmbH of Heilbronn, Germany and Cytec Industries Inc. of Woodland Park, N.J. USA.

A representative liquid or gel separator printable composition (or ink) and a resulting representative liquid or gel separator 200 may further comprise one or more additional, second electrolyte different from the first electrolyte, such as an acid, a base, a salt dissolved in a solvent (e.g., water, an organic solvent), or a salt dissolvable or miscible in an ionic liquid, to form free ions. In a representative embodiment, a second electrolyte comprises one or more electrolytes selected from the group consisting of: potassium hydroxide, sodium hydroxide, ammonium hydroxide, lithium hydroxide, nickel hydroxide, cadmium hydroxide, magnesium hydroxide, sulfuric acid, hydrochloric acid, fluoroboric acid, ammonium chloride, zinc chloride, zinc bis(trifluoromethanesulfonyl)imide, aluminium chloride, chromium chloride, magnesium perchloride, barium chromate, lithium chromate, lithium-thyonyl chloride, lithiujm perchlorate, lithium bromide, lithium triflate, lithium hexafluorophosphate, lithium tetrafluoroborate, lithium bis-oxalato borate, lithium bis(trifluoromethanesulfonyl)imide, lithium bisoxalatoborate, lithium iodide, lithium tetrachloroaluminate, potassium carbonate, potassium fluoride, potassium borate, silver nitride, silver tetrafluoroborate; and mixtures thereof.

Also forming the liquid or gel separator printable composition and resulting liquid or gel separator 200 are one or more polymers (or equivalently, polymeric precursors or polymerizable precurors in the printable composition which are in turn in a polymerized, cured or dried form in the liquid or gel separator 200), or viscosity modifiers, binders, resins or thickeners (as a viscosity modifier) (or equivalently, a viscous compound, a viscous resin, a viscous agent, a viscous polymer, a viscous resin, a viscous binder, a thickener, and/or a rheology modifier) may be used, for example and without limitation: polymers (or equivalently, polymeric precursors or polymerizable precurors) such as polyvinyl pyrrolidone ("PVP", also referred to or known as polyvinyl pyrrolidinone), polyvinyl alcohol ("PVA"), polyvinylidene fluoride ("PVFD"), polyvynylidene fluoride-trifluoroethylene, polytetrafluoroethylene ("PTFE"), polydimethylsiloxane, polyethelene, polypropylene, polyethylene oxide, polypropylene oxide, polyethylene glycolhexafluoropropylene, polyethylene terefphtalatpolyacrylonitryle, polyvinylalcogel, polyvinylpyrrolidone, polyvynilchloride, polyvinyl butyral; polyimide polymers and copolymers (including aliphatic, aromatic and semi-aromatic polyimides) such as polyamide, polyaramides, polyacrylamide; acrylate and (meth)acrylate polymers and copolymers such as polymethylmethacrylate, polyacrylonitrile, acrylonitrile butadiene styrene, allylmethacrylate, polyvinylcaprolactam, polystyrene, polybutadiene, polybutylene terephthalate, polycarbonate, polychloroprene, polyethersulfone, nylon, styrene-acrylonitrile resin; clays such as hectorite clays, garamite clays, organo-modified clays; saccharides and polysaccharides such as guar gum, xanthan gum, starch, butyl rubber, agarose, pectin; celluloses and modified celluloses such as hydroxy methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan; fumed silica (such as Cabosil), silica powders and modified ureas such as BYK® 420 (available from BYK Chemie GmbH); and mixtures thereof. As mentioned above, some of the viscosity modifiers may also function as solvents and vice-versa, such as the various glycols, and therefore are included in the various listings of representative solvents and viscosity modifiers. In an exemplary embodiment, the PVA utilized has a molecular weight between about 10,000 to about 250,000 MW, while the PVDF has a molecular weight between about 1,000 to about 500,000 MW, and may be obtained respectively from Polysciences, Inc. of Warrington, Pa. USA and Arkema of King of Prussia, Pa. USA. PTFE may be obtained from DuPont, of Wilmington, Del., USA. In various embodiments, E-3 and E-10 cellulose resins available from The Dow Chemical Company (www.dow.com) and Hercules Chemical Company, Inc. (www.herchem.com) may be utilized. Other viscosity modifiers may be used, as well as particle addition to control viscosity, as described in Lewis et al., Patent Application Publication Pub. No. US 2003/0091647. Other viscosity modifiers or binders may also be utilized. Any of these various polymers may also be utilized to form a sealant 35.

Various solvents may also be utilized to form liquid or gel separator printable composition (and trace amount or more may remain in the resulting liquid or gel separator 200), such as, for example, to adjust viscosity or other properties of the liquid or gel separator printable composition. One or more solvents (as first, second, third fourth, etc., solvents) may be used equivalently, for example and without limitation: solvents selected from the group consisting of: water; alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; glycols such as ethylene glycols, diethylene glycols, polyethylene glycols, propylene glycols, dipropylene glycols, glycol ethers, glycol ether acetates; carbonates such as propylene carbonate; glycerols and other polyols and polymeric polyols or glycols such as glycerin, diol, triol, tetraol, pentaol, ethylene glycol, 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO), thionyl chloride; sulfuryl chloride; and mixtures thereof. Any of these various solvents may also further comprise an acid or a base (liquid or dissolved solid), such as to adjust overall pH (or pK), including inorganic and/or organic acids such as carboxylic acids (including dicarboxylic acids, tricarboxylic acids, alkyl carboxylic acids, and so on, e.g., dicarboxylic acids such as propanedioic (malonic) acid, butanedioic (succinic) acid, pentanedioic (glutaric) acid, hexanedioic (adipic) acid, heptanedioic (pimelic) acid, octanedioic (suberic) acid, nonanedioic (azelaic) acid, decanedioic (sebacic) acid, undecanedioic acid, dodecanedioic acid, tridecanedioic (brassylic) acid, tetradecanedioic acid, pentadecanedioic acid, hexadecanedioic (thapsic) acid, octadecanedioic acid); acetic acid; oxalic acid; mellitic acid; formic acid, chloroacetic acid; benzoic acid; trifluoroacetic acid; propanoic acid; butanoic acid; hydrochloric acid; sulfuric acid; carbonic acid; and bases such as ammonium hydroxide, sodium hydroxide, potassium hydroxide; and mixtures thereof.

A conductive substrate utilized to form a first conductor or conductive layer 110A may be any type of prefabricated substrate 105 discussed below which has been coated or otherwise has deposited a conductor or conductive layer (e.g., a first conductor 110 as described above and below). A conductive substrate utilized to form a first conductor or conductive layer 110A may be any type of conductor, mixture of conductors, alloys of conductors, etc., including those discussed above and below, which has or have a form factor suitable for deposition of the layer 120 or 125 such as, for example and without limitation, a conductive foil or sheet, such as an aluminum foil, a nickel foil, a carbon foil, a carbon foam sheet, a CNT foil, a graphene foil, a silver foil, a gold foil, an iron sheet, a steel sheet, other types of sheet metal, etc.

The substrate (or base) 105 may be comprised of any suitable material, such as plastic, paper, cardboard, or coated paper or cardboard, for example and without limitation. The substrate 105 may comprise any flexible or nonflexible material having the strength and degree of electrical insulation to withstand the intended use conditions. In an exemplary embodiment, a substrate 105 comprises a polyester or plastic sheet, such as a CT-7 seven mil polyester sheet treated for print receptiveness commercially available from MacDermid Autotype, Inc. of MacDermid, Inc. of Denver, Colo., USA, for example. In another exemplary embodiment, a substrate 105 comprises a polyimide film such as Kapton commercially available from DuPont, Inc. of Wilmington Del., USA, also for example. Also in an exemplary embodiment, substrate 105 comprises a material having a dielectric constant capable of or suitable for providing sufficient electrical insulation for the excitation and discharge voltages which may be selected. A substrate 105 may comprise, also for example, any one or more of the following: paper, coated paper, plastic coated paper, fiber paper, cardboard, poster paper, poster board, books, magazines, newspapers, wooden boards, plywood, and other paper or wood-based products in any selected form; plastic or polymer materials in any selected form (sheets, film, boards, and so on); natural and synthetic rubber materials and products in any selected form; natural and synthetic fabrics in any selected form; glass, ceramic, and other silicon or silica-derived materials and products, in any selected form; building materials and products; or any other product, currently existing or created in the future. In a first exemplary embodiment, a substrate 105 may be selected which provides a degree of electrical insulation (i.e., has a dielectric constant or insulating properties sufficient to provide electrical insulation of the one or more first conductors 110 deposited or applied on a first (front) side of the substrate 105), either electrical insulation from each other or from other apparatus or system components. For example, while comparatively expensive choices, a glass sheet or a silicon wafer also could be utilized as a substrate 105. In other exemplary embodiments, however, a plastic sheet or a plastic-coated paper product is utilized to form the substrate 105 such as the polyester mentioned above or patent stock and 100 lb. cover stock available from Sappi, Ltd., or similar coated papers from other paper manufacturers such as Mitsubishi Paper Mills, Mead, and other paper products. In another exemplary embodiment, an embossed plastic sheet or a plastic-coated paper product having a plurality of grooves, also available from Sappi, Ltd. is utilized, with the grooves utilized for forming the conductors 110. Suitable substrates 105 also potentially include extruded polyolefinic films, including LDPE films; polymeric nonwovens, including carded, melt-blown and spunbond nowovens, and cellulosic paper. The substrate 105 may also comprise laminates of any of the foregoing materials. Two or more laminae may be adhesively joined, thermally bonded, or autogenously bonded together to form the laminate comprising the substrate. If desired, the laminae may be embossed.

The exemplary substrate 105 (or conductive substrate utilized to form a first conductor or conductive layer 110A) as illustrated in the various Figures has a form factor which is substantially flat in an overall sense, such as comprising a sheet of a selected material (e.g., paper or plastic or foil) which may be fed through a printing press, for example and without limitation, and which may have a topology on a first surface (or side) which includes surface roughness, cavities, channels or grooves or having a first surface which is substantially smooth within a predetermined tolerance (and does not include cavities, channels or grooves). Those having skill in the art will recognize that innumerable, additional shapes and surface topologies are available, are considered equivalent and within the scope of the disclosure.

The first and second conductors (which also may be considered electrodes or current collectors) 110 (110A), 115 may be comprised of any suitable material, applied or deposited (on a first side or surface of the substrate 105), such as through a printing process, to a thickness depending upon the type of conductive ink or polymer and the selected embodiment, such as to about 0.1 to 6 microns (e.g., about 3 microns for a typical silver ink, gold ink, aluminum ink, and to less than one micron for a nanosilver ink), for example and without limitation. In an exemplary method of manufacturing the representative energy storage device 100, 101 embodiments, a conductive ink, polymer, or other conductive liquid or gel (such as a silver (Ag) ink or polymer, a nano silver ink composition, a carbon nanotube ink or polymer, or silver/carbon mixture such as amorphous nanocarbon (having particle sizes between about 75-100 nm) dispersed in a silver ink) is deposited on a substrate 105, such as through a printing or other deposition process, and may be subsequently cured or partially cured (such as through an ultraviolet (uv) curing process), to form the one or more first conductors 110. Similar processes may also be utilized to form a second conductor 115. In another exemplary embodiment, the one or more first and second conductors 110, 115 may be formed by sputtering, spin casting (or spin coating), vapor deposition, or electroplating of a conductive compound or element, such as a metal (e.g., aluminum, copper, silver, gold, nickel, palladium). Combinations of different types of conductors and/or conductive compounds or materials (e.g., ink, polymer, elemental metal, etc.) may also be utilized to generate one or more composite first and second conductors 110, 115. Multiple layers and/or types of metal or other conductive materials may be combined to form the one or more first and second conductors 110 (110A), 115. In various exemplary embodiments, a plurality of first and second conductors 110 (110A), 115 are deposited, and in other embodiments, a first or second conductor 110 (110A), 115 may be deposited as a single conductive sheet or otherwise attached (e.g., a sheet of aluminum coupled to a substrate 105) (not separately illustrated).

Other conductive inks or materials may also be utilized to form the one or more first and second conductors 110, 115, such as copper, tin, aluminum, gold, noble metals, carbon, carbon foam, carbon black, single or double or multi-walled CNTs, graphene, graphene platelets, nanographene platelets, nanocarbon and nanocarbon and silver compositions, nano silver compositions (including nanosilver fiber and nanosilver particle inks), or other organic or inorganic conductive polymers, inks, gels or other liquid or semi-solid materials. A representative conductive ink is disclosed in U.S. patent application Ser. No. 13/360,999, filed Jan. 30, 2012, entitled "Metallic Nanofiber Ink, Substantially Transparent Conductor, and Fabrication Method" (the "second related patent application"), the entire contents of which are incorporated herein by reference with the same full force and effect as if set forth in their entirety herein, and with priority claimed for all commonly disclosed subject matter. In an exemplary embodiment, carbon black (having a particle diameter of about 100 nm) is added to a silver ink to have a resulting carbon concentration in the range of about 0.025% to 0.1%. In addition, any other printable or coatable conductive substances may be utilized equivalently to form the first and second conductors 110, 115, and exemplary conductive compounds include: (1) from Conductive Compounds (Londonberry, N.H., USA), AG-500, AG-800 and AG-510 Silver conductive inks, which may also include an additional coating UV-10065 ultraviolet curable dielectric (such as part of a first dielectric layer 125); (2) from DuPont, 7102 Carbon Conductor (if overprinting 5000 Ag), 7105 Carbon Conductor, 5000 Silver Conductor, 7144 Carbon Conductor (with UV Encapsulants), 7152 Carbon Conductor (with 7165 Encapsulant), and 9145 Silver Conductor; (3) from SunPoly, Inc., 128A Silver conductive ink, 129A Silver and Carbon Conductive Ink, 140A Conductive Ink, and 150A Silver Conductive Ink; (4) from Dow Corning, Inc., PI-2000 Series Highly Conductive Silver Ink; (5) from Henkel/Emerson & Cumings, Electrodag 725A; and (6) Monarch M120 available from Cabot Corporation of Boston, Mass., USA, for use as a carbon black additive, such as to a silver ink to form a mixture of carbon and silver ink. In addition, conductive inks and compounds may be available from a wide variety of other sources.

Conductive polymers which also may be substantially optically transmissive may also be utilized to form the one or more first and second conductors 110, 115. For example, polyethylene-dioxithiophene may be utilized, such as the polyethylene-dioxithiophene commercially available under the trade name "Orgacon" from AGFA Corp. of Ridgefield Park, N.J., USA, in addition to any of the other transmissive conductors discussed below and their equivalents. Other conductive or semiconductive polymers, without limitation, which may be utilized equivalently include polyaniline and polypyrrole polymers, for example. In another exemplary embodiment, carbon nanotubes which have been suspended or dispersed in a polymerizable ionic liquid or other fluids are utilized to form various conductors which are substantially optically transmissive or transparent.

Organic semiconductors, variously called $\pi$-conjugated polymers, conducting polymers, or synthetic metals, are inherently semiconductive due to $\pi$-conjugation between carbon atoms along the polymer backbone, and also may be utilized to form first and second conductors 110 (110A), 115. Their structure contains a one-dimensional organic backbone which enables electrical conduction following $n^-$ or $p^+$ type doping. Well-studied classes of organic conductive polymers include poly(acetylene)s, poly(pyrrole)s, poly(thiophene)s, polyanilines, polythiophenes, poly(p-phenylene sulfide), poly(para-phenylene vinylene)s (PPV) and PPV derivatives, poly(3-alkylthiophenes), polyindole, polypyrene, polycarbazole, polyazulene, polyazepine, poly(fluorene)s, and polynaphthalene. Other examples include polyaniline, polyaniline derivatives, polythiophene, polythiophene derivatives, polypyrrole, polypyrrole derivatives, polythianaphthene, polythianaphthane derivatives, polyparaphenylene, polyparaphenylene derivatives, polyacetylene, polyacetylene derivatives, polydiacethylene, polydiacetylene derivatives, polyparaphenylenevinylene, polyparaphenylenevinylene derivatives, polynaphthalene, and polynaphthalene derivatives, polyisothianaphthene (PITN), polyheteroarylenvinylene (ParV), in which the heteroarylene group can be, e.g., thiophene, furan or pyrrol, polyphenylene-sulphide (PPS), polyperinaphthalene (PPN), polyphthalocyanine (PPhc) etc., and their derivatives, copolymers thereof and mixtures thereof. As used herein, the term derivatives means the polymer is made from monomers substituted with side chains or groups.

The method for polymerizing the conductive polymers is not particularly limited, and the usable methods include uv or other electromagnetic polymerization, heat polymerization, electrolytic oxidation polymerization, chemical oxidation polymerization, and catalytic polymerization, for example and without limitation. The polymer obtained by the polymerizing method is often neutral and not conductive until doped. Therefore, the polymer is subjected to p-doping or n-doping to be transformed into a conductive polymer. The semiconductor polymer may be doped chemically, or electrochemically. The substance used for the doping is not particularly limited; generally, a substance capable of accepting an electron pair, such as a Lewis acid, is used. Examples include hydrochloric acid, sulfuric acid, organic sulfonic acid derivatives such as parasulfonic acid, polystyrenesulfonic acid, alkylbenzenesulfonic acid, camphorsulfonic acid, alkylsulfonic acid, sulfosalycilic acid, etc., ferric chloride, copper chloride, and iron sulfate.

In a representative or exemplary embodiment for a battery, a layer 120 such as an anode is formed by printing (on a first conductor (electrode or current collector) 110, 110A such as aluminum foil) using an anode ink comprising about 85% zinc (in powder or particle form), about 0.5-1.0% PVDF, and about 14% tetramethylurea or N-methyl-2-pyrrolidinone, and after curing and/or drying, the anode layer 120 generally comprises zinc and PVDF, and any trace amounts of the solvents, and is about 5-60 microns thick.

In a representative or exemplary embodiment for a battery, a layer 125 such as a cathode is formed by printing (over the liquid or gel separator 200) using a cathode ink comprising about 41% manganese dioxide (in powder or particle form), about 3.5% conductive graphite powder, about 1.0-2.5% PVDF, and about 53% tetramethylurea or N-methyl-2-pyrrolidinone, and after curing and/or drying, the cathode layer 125 generally comprises manganese dioxide, graphite and PVDF, and any trace amounts of the solvents, and is about 5-60 microns thick.

Also in a representative or exemplary embodiment for a battery, a liquid or gel separator printable composition comprises about 52.7% silicate glass spheres having a diameter of about 7 microns each, about 2.8% PVDF or PVA, about 19.6% N-methyl-2-pyrrolidinone, and about 24.9% of an electrolyte comprising zinc tetrafluoroborate salt dissolved in 1-ethyl-3-methylimidalzolium tetrafluoroborate ionic liquid, with the resulting liquid or gel separator 200 generally having a thickness of about double the diameters of the particles 150, such as about 10-15 microns, and comprising the glass spheres, the PVDF or PVA, and the electrolytes.

Those having skill in the electronic or printing arts will recognize innumerable variations in the ways in which the one or more first and second conductors 110, 110A, 115, layers 120 and 125 (anode and cathode layers), and liquid or gel separator 200, may be formed, with all such variations considered equivalent and within the scope of the disclosure. For example, any of the one or more first and second conductors 110, 110A, 115, layers 120 and 125 (anode and cathode layers), and liquid or gel separator 200 may also be deposited through sputtering or vapor deposition, without limitation. In addition, for other various embodiments, the one or more first and second conductors 110, 115 may be deposited as a single or continuous layer, such as through coating, printing, sputtering, or vapor deposition, such as to form multiple electrodes or battery cells. Those having skill in the electronic or printing arts also will recognize innumerable variations in the ways in which the liquid or gel separator 200 and any of the layers 120 and 125 (anode and cathode layers) may be deposited, such as through printing, with all such variations considered equivalent and within the scope of the disclosure.

As a consequence, as used herein, "deposition" includes any and all printing, coating, rolling, spraying, layering, sputtering, plating, spin casting (or spin coating), vapor deposition, lamination, affixing and/or other deposition processes, whether impact or non-impact, known in the art. "Printing" includes any and all printing, coating, rolling, spraying, layering, spin coating, lamination and/or affixing processes, whether impact or non-impact, known in the art, and specifically includes, for example and without limitation, screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing, for example. All such processes are considered deposition processes herein and may be utilized. The exemplary deposition or printing processes do not require significant manufacturing controls or restrictions. No specific temperatures or pressures are required. Some clean room or filtered air may be useful, but potentially at a level consistent with the standards of known printing or other deposition processes. For consistency, however, such as for proper alignment (registration) of the various successively deposited layers forming the various embodiments, relatively constant temperature (with possible exceptions, discussed below, such as for applied heat for bonding) and humidity may be desirable. In addition, the various compounds utilized may be contained within various polymers, binders or other dispersion agents which may be heat-cured or dried, air dried under ambient conditions, or IR or uv cured.

It should also be noted, generally for any of the applications of various compounds herein, such as through printing or other deposition, the surface properties or surface energies may also be controlled, such as through the use of resist coatings or by otherwise modifying the "wetability" of such a surface, for example, by modifying the hydrophilic, hydrophobic, or electrical (positive or negative charge) characteristics, for example, of surfaces such as the surface of the substrate 105, the surfaces of the various first and second conductors 110, 115, and/or other surfaces formed during fabrication. In conjunction with the characteristics of the compound, suspension, polymer or ink being deposited, such as the surface tension, the deposited compounds may be made to adhere to desired or selected locations, and effectively repelled from other areas or regions.

Representative embodiments provide a liquid or gel separator utilized to separate and space apart first and second electrodes of an energy storage device, such as a battery or a supercapacitor, which is formed from a composition that is capable of being printed on a wide variety of surfaces, including irregular, uneven or otherwise non-smooth surfaces, for example and without limitation. A resulting representative liquid or gel separator also may be flexible and capable of being printed or otherwise applied in a wide variety of configurations, shapes, and form factors. An exemplary liquid or gel separator also may be comparatively thin and minimizes or diminishes resistivity or other impedance, and further has a comparatively high ionic conductivity. In addition, a representative embodiment of a liquid or gel separator has sufficient structural strength and integrity to allow and facilitate the printing of additional layers, such as additional electrodes and intervening energy storage materials and compositions.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment and not necessarily in all embodiments, and further, are not necessarily referring to the same embodiment. Furthermore, the particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A liquid or gel separator for separating and spacing apart at least two conductors, the liquid or gel separator comprising:
   a plurality of particles arranged as one or more layers, the plurality of particles comprising silicate glass having a size between 5 microns to 15 microns and present in an amount between 40 to 75 percent of the total weight of the separator;
   an ionic liquid as a first electrolyte, the ionic liquid comprising at least one methylimidazolium ionic liquid;

a second electrolyte comprising zinc tetrafluoroborate salt, the first and second electrolytes present in an amount between 15 to 45 percent of the total weight of the separator; and a polymer present in an amount between 0.5 to 15 percent of the total weight of the separator and comprising polyvinyl alcohol ("PVA") or polyvinylidene fluoride ("PVFD").

2. The liquid or gel separator of claim 1, wherein at least some particles of the plurality of silicate glass particles are hollow.

3. The liquid or gel separator of claim 1, further comprising at least a trace amount of N-methyl-2-pyrrolidinone.

4. The liquid or gel separator of claim 1, wherein at least some particles of the plurality of silicate glass particles are arranged as a monolayer.

5. The separator of claim 1, wherein the first electrolyte further comprises one or more ionic liquid cations selected from the group consisting of: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl (tetradecyl)phosphonium, trihexyl (tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and mixtures thereof.

6. The separator of claim 1, wherein the first electrolyte further comprises one or more ionic liquid anions selected from the group consisting of: tris(pentafluoroethyl)trifluorophosphate, trifluoromethanesulfonate, hexafluorophosphate, tetrafluoroborate, ethyl sulfate, methyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, thiocyanate, and mixtures thereof.

7. The separator of claim 1, further comprising a third electrolyte different from the first and second electrolytes, the third electrolyte comprising one or more electrolytes selected from the group consisting of: potassium hydroxide, sodium hydroxide, ammonium hydroxide, lithium hydroxide, nickel hydroxide, cadmium hydroxide, magnesium hydroxide, sulfuric acid, hydrochloric acid, fluoroboric acid, ammonium chloride, zinc chloride, zinc bis(trifluoromethanesulfonyl)imide, aluminium chloride, chromium chloride, magnesium perchloride, barium chromate, lithium chromate, lithium-thyonyl chloride, lithiujm lithium perchlorate, lithium bromide, lithium triflate, lithium hexafluorophosphate, lithium tetrafluoroborate, lithium bis-oxalato borate, lithium bis(trifluoromethanesulfonyl)imide, lithium bisoxalatoborate, lithium iodide, lithium tetrachloroaluminate, potassium carbonate, potassium fluoride, potassium borate, silver nitride, silver tetrafluoroborate; salts of bis(trifluoromethylsulfonyl)imide, tris(pentafluoroethyl)trifluorophosphate, trifluoromethanesulfonate, hexafluorophosphate, tetrafluoroborate, ethyl sulfate, dimethyl phosphate, trifluoromethanesulfonate, triflate, tricyanomethanide, dibutylphosphate; and mixtures thereof.

8. A method of fabricating a liquid or gel separator for separating and spacing apart at least two conductors, the method comprising:

depositing a composition over a first conductor of the at least two conductors, the composition comprising:

a plurality of particles comprising silicate glass having a size between 5 microns to 15 microns and present in an amount between 40 to 60 percent of the total weight of the composition;

an ionic liquid as a first electrolyte, the ionic liquid comprising at least one methylimidazolium ionic liquid;

a second electrolyte comprising zinc tetrafluoroborate salt, the first and second electrolytes present in an amount between 15 to 30 percent of the total weight of the composition;

a polymer present in an amount between 0.5 to 10 percent of the total weight of the composition and comprising polyvinyl alcohol ("PVA") or polyvinylidene fluoride ("PVFD"); and N-methyl-2-pyrrolidinone present in an amount between 10 to 30 percent of the total weight of the composition.

9. The method of claim 8, wherein the step of depositing comprises printing the composition.

10. The method of claim 8, wherein at least some particles of the plurality of silicate glass particles of the composition are hollow.

11. The method of claim 8, wherein the step of depositing further comprises arranging at least some particles of the plurality of silicate glass particles as a monolayer.

12. The method of claim 8, wherein the first electrolyte of the composition further comprises one or more ionic liquid cations selected from the group consisting of: butyltrimethylammonium, 1-ethyl-3-methylimidazolium, 1-butyl-3-methylimidazolium, 1-methyl-3-propylimidazolium, 1-hexyl-3-methylimidazolium, choline, ethyl ammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and mixtures thereof.

13. The method of claim 8, wherein the first electrolyte of the composition further comprises one or more ionic liquid anions selected from the group consisting of: tris(pentafluoroethyl)trifluorophosphate, trifluoromethanesulfonate, hexafluorophosphate, tetrafluoroborate, ethyl sulfate, methyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, thiocyanate, and mixtures thereof.

14. The method of claim 8, wherein the composition further comprises a third electrolyte different from the first and second electrolytes, the third electrolyte comprising one or more electrolytes selected from the group consisting of: potassium hydroxide, sodium hydroxide, ammonium hydroxide, lithium hydroxide, nickel hydroxide, cadmium hydroxide, magnesium hydroxide, sulfuric acid, hydrochloric acid, fluoroboric acid, ammonium chloride, zinc chloride, zinc bis(trifluoromethanesulfonyl)imide, aluminium chloride, chromium chloride, magnesium perchloride, barium chromate, lithium chromate, lithium-thyonyl chloride, lithium perchlorate, lithium bromide, lithium triflate, lithium hexafluorophosphate, lithium tetrafluoroborate, lithium bis-oxalato borate, lithium bis(trifluoromethanesulfonyl)imide, lithium bisoxalatoborate, lithium iodide, lithium tetrachloroaluminate, potassium carbonate, potassium fluoride, potassium borate, silver nitride, silver tetrafluoroborate; salts of bis(trifluoromethylsulfonyl)imide, tris(pentafluoroethyl)trifluorophosphate, trifluoromethanesulfonate, hexafluorophosphate, tetrafluoroborate, ethyl sulfate, dimethyl phosphate, trifluoromethanesulfonate, triflate, tricyanomethanide, dibutylphosphate; and mixtures thereof.

15. A liquid or gel separator for separating and spacing apart at least two conductors, the liquid or gel separator comprising:
   a plurality of particles comprising silicate glass having a size between 5 microns to 15 microns and present in an amount between 40 to 75 percent of the total weight of the separator, wherein at least some particles of the plurality of silicate glass particles are arranged as a monolayer;
   an ionic liquid as a first electrolyte, the ionic liquid comprising at least one methylimidazolium ionic liquid;
   a second electrolyte comprising zinc tetrafluoroborate salt, the first and second electrolytes present in an amount between 15 to 45 percent of the total weight of the separator; a polymer present in an amount between 0.5 to 15 percent of the total weight of the separator and comprising polyvinyl alcohol ("PVA") or polyvinylidene fluoride ("PVFD"); and
   at least a trace amount of N-methyl-2-pyrrolidinone.

16. The liquid or gel separator of claim 15, wherein the plurality of silicate glass particles are a mixture of solid and hollow particles.

17. The separator of claim 15, wherein the first electrolyte further comprises one or more ionic liquid cations selected from the group consisting of: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and mixtures thereof.

18. The separator of claim 15, wherein the first electrolyte further comprises one or more ionic liquid anions selected from the group consisting of: tris(pentafluoroethyl)trifluorophosphate, trifluoromethanesulfonate, hexafluorophosphate, tetrafluoroborate, ethyl sulfate, methyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, thiocyanate, and mixtures thereof.

19. The liquid or gel separator of claim 15, wherein the plurality of silicate glass particles are greater than zero microns and less than 10 microns in any dimension.

20. The liquid or gel separator of claim 15, wherein the plurality of silicate glass particles have a size of 7 microns, plus or minus 2 microns, in any dimension.

* * * * *